(12) United States Patent
Bourgeois et al.

(10) Patent No.: US 10,838,828 B2
(45) Date of Patent: Nov. 17, 2020

(54) METHODS AND SYSTEMS RELATING TO NETWORK BASED STORAGE

(71) Applicant: HUBSTOR INC., Kanata (CA)

(72) Inventors: Geoffrey Bourgeois, Greely (CA); Greg Campbell, Greely (CA)

(*) Notice: Subject to any disclaimer, the term of this patent is extended or adjusted under 35 U.S.C. 154(b) by 175 days.

(21) Appl. No.: 16/044,945

(22) Filed: Jul. 25, 2018

(65) Prior Publication Data

US 2019/0034295 A1  Jan. 31, 2019

Related U.S. Application Data

(60) Provisional application No. 62/536,677, filed on Jul. 25, 2017.

(51) Int. Cl.

| G06F 12/14 | (2006.01) |
|---|---|
| G06F 11/14 | (2006.01) |
| H04L 29/06 | (2006.01) |
| G06F 16/33 | (2019.01) |
| G06F 16/35 | (2019.01) |
| G06F 16/11 | (2019.01) |
| H04L 29/08 | (2006.01) |

(52) U.S. Cl.
CPC ...... G06F 11/1469 (2013.01); G06F 11/1448 (2013.01); G06F 16/125 (2019.01); G06F 16/334 (2019.01); G06F 16/353 (2019.01); H04L 63/145 (2013.01); G06F 2201/80 (2013.01); G06F 2216/03 (2013.01); H04L 67/1097 (2013.01)

(58) Field of Classification Search
CPC ............ G06F 11/1461; G06F 11/1469; G06F 2206/1014; G06F 2201/86; H04L 63/108
USPC ......................................................... 726/24
See application file for complete search history.

(56) References Cited

U.S. PATENT DOCUMENTS

| 8,171,386 | B2* | 5/2012 | Chandra | G06F 11/00 714/822 |
|---|---|---|---|---|
| 2006/0123232 | A1* | 6/2006 | Cannon | G06F 3/0637 713/165 |
| 2009/0119354 | A1* | 5/2009 | Stuart | G06F 16/125 |
| 2014/0317157 | A1* | 10/2014 | Sparkes | G06F 16/181 707/822 |
| 2018/0276223 | A1* | 9/2018 | Dhanasekaran | G06F 16/1844 |
| 2018/0349269 | A1* | 12/2018 | Garg | G06F 3/0685 |

OTHER PUBLICATIONS

Sion et al, Fighting Mallory the Insider: Strong Write-Once Read-Many Storage Assurances, 2011, IEEE, pp. 755-764.*
Hasan et al, Efficient Audit-Based Compliance for Relational Data Retention, Mar. 24, 2011, ACM, pp. 238-248.*

* cited by examiner

*Primary Examiner* — Alexander Lagor
*Assistant Examiner* — Jenise E Jackson
(74) *Attorney, Agent, or Firm* — Rosenberg, Klein & Lee

(57) ABSTRACT

Cloud storage provides for accessible interfaces, near-instant elasticity and scalability, multi-tenancy, and metered resources within a framework of distributed resources acing to provide highly fault tolerant solutions with high data durability. However, cloud storage also has drawbacks and limitations with information uploading and how information is subsequently accessed.

18 Claims, 11 Drawing Sheets

METHODS AND SYSTEMS RELATING TO NETWORK BASED STORAGE

CROSS-REFERENCE TO RELATED APPLICATIONS

This patent application claims the benefit of U.S. Provisional Patent Application 62/536,677 filed Jul. 25, 2017 entitled "Methods and Systems Relating to Network Based Storage", the entire contents of which are incorporated by reference.

FIELD OF THE INVENTION

This invention relates to network and/or cloud based storage and more particularly to methods, processes, and knowledge worker interfaces for writing, managing, and classifying data to network and/or cloud storage including:
Leveraging an Archive or Storage Tier for Optimal File System Recovery;
Event-based Retention Management;
Performing Inline Data Classification During a Policy Evaluation Process for Archiving to Cloud Storage;
Providing Item-level Write Once Read Many Compliance Storage Policies in Cloud Storage;
Synchronizing Security Access Controls with Drive Shipping Content Ingestion to Cloud Storage; and
Virus Scanning Content in Cloud Storage and Quarantining Infected Items.

BACKGROUND OF THE INVENTION

Cloud storage has evolved in the last decade from a model being presented as a solution to evolving data storage needs to the main storage form for many enterprises, organizations and individuals. In 2013 over 1,000 Petabytes of data were stored in the cloud, i.e. over 1,000,000,000 Gigabytes. By 2014 a single social network, Facebook™, alone stored approximately 400 Petabytes of data. Cloud storage represents a data storage model where data is stored in logical pools, the physical storage spans multiple servers and often locations, and the physical environment is typically owned and managed by a hosting company and/or service provider. These cloud storage providers are responsible for keeping the data available and accessible, and the physical environment protected and running. People and organizations buy or lease storage capacity from the providers to store user, organization, or application data. Cloud storage services may be accessed through a co-located cloud computer service, a web service application programming interface (API) or by applications that utilize the API, such as cloud desktop storage, a cloud storage gateway or Web-based content management systems.

Accordingly, cloud storage is based on a highly virtualized infrastructure and is like the broader concept of cloud computing in terms of accessible interfaces, near-instant elasticity and scalability, multi-tenancy, and metered resources. Cloud storage, a form of network based storage, is made up of many distributed resources, but still acts as one (often referred to as federated storage clouds), is highly fault tolerant through redundancy and distribution of data, highly durable through the creation of versioned copies, and generally what is known as "eventually consistent" with regard to data replicas.

However, cloud storage also comes with some drawbacks and limitations in how this information is uploaded (or ingested) and how a user or users access this information subsequently in comparison to the management tools etc. that the user is typically used to using. Whilst tools such as Microsoft One Drive offer individual users functionality similar to Microsoft Explorer for managing files and integrate to software applications such as Microsoft's own Word, Excel and PowerPoint there is a lack of automated tools for managing tens, hundreds and thousands of users within enterprises and organizations. Migrating to the cloud for these is a massive undertaking.

Accordingly, it would be beneficial to provide knowledge workers, e.g. users, with processes, methods, and systems that address these limitations.

Amongst these is that traditionally backup systems will make a copy of whatever is on the source system, and in a recovery scenario, the backup system will recover the full copy onto the source system. Typically, source systems (in this case, enterprise file systems) are known to contain 80-90% inactive data which means that 80-90% of a restore job is spent recovering old data that is important, but not mission critical in an immediate recovery objective. However, where enterprises exploit cloud storage as an offsite data protection for their backups then if the backup is restoring the entire copy in a recovery scenario, the enterprise not only pay for all the data transfer and storage activity in cloud economics to fetch the large backups containing mostly old data, but they also incur the large hit on their network connection to download the backup.

Accordingly, it would be beneficial to provide enterprises with a means to prioritise the backup recovery process from cloud storage so that the enterprise is back operational as soon as possible and the overall data recovery process can be staged to reflect enterprise requirements, network connectivity, etc.

Further, organizations must comply with regulatory requirements to preserve records for a defined period of time after a specific event. Current cloud storage systems lack an efficient method of managing this retention. Accordingly, it would be beneficial to provide users with a means to assign records as being immutable from their time of creation, given that their exact retention period may not be known until a triggering event occurs whereby a specific retention period can be assigned to the associated record(s).

Organizations may often need to store private/sensitive data which may have legal or regulatory requirements against such data being stored in the public cloud. However, these organizations still wish to use the cloud to archive data that is eligible. The problem is not completely solved by performing a data classification exercise and then running archive rules to move certain data to the cloud because of the decoupled nature of these two processes. Between classifying data and moving it to the cloud, there is potential for new items/records (or modified items/records) to enter the scope of archiving that contain personally identifiable information (PII) or personal health information (PHI). If the organization were to accidentally store PII/PHI data in the cloud, it would have significant potential of harming their business in a compliance audit or legal claim. Accordingly, it would be beneficial to provide organizations with a cloud storage solution that addresses these conflicting demands of storing into the cloud and maintaining legal compliance.

Further, organizations faced with regulatory requirements (Sarbanes-Oxley, SEC/FINRA Rule 17a-4, CFTC, FDA, etc.) to preserve records immutably are not able to defensibly use public cloud storage for write once ready many (WORM) compliant archiving at this point as no prior art methodologies exist. Accordingly, it would be beneficial to provide organizations with a means to handle WORM retention policies by evaluating in real-time during the writing process these policies and applying retention periods to items meeting policy criteria.

Organizations want to use cloud storage to backup and archive their data, but they also need to scan their content for viruses and malware. When storing data in block blob storage accounts, the content is not in a file system that Anti-Virus (AV) programs can natively scan subsequently as virus definitions etc. are amended. Accordingly, it would be beneficial to provide users with a means to subsequently perform a virus scan of archived data within a remote storage location.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to network and/or cloud based storage and more particularly to methods, processes, and knowledge worker interfaces for writing, managing, and classifying data to network and/or cloud storage including:
Leveraging an Archive or Storage Tier for Optimal File System Recovery;
Event-based Retention Management;
Performing Inline Data Classification During a Policy Evaluation Process for Archiving to Cloud Storage;
Providing Item-level Write Once Read Many Compliance Storage Policies in Cloud Storage;
Synchronizing Security Access Controls with Drive Shipping Content Ingestion to Cloud Storage; and
Virus Scanning Content in Cloud Storage and Quarantining Infected Items.

In accordance with an embodiment of the invention there is provided a computer-implemented method of recovering unstructured data sets whereby only the active data is recovered in full and the inactive data is ghosted, comprising the steps of:
executing a backup copy of the source file system;
providing a user interface in a recovery scenario allowing a user to assign a first predetermined portion of the backup copy to be recovered in full and a second predetermined portion of the backup copy should be recovered as at least one of pointers and stubs to the content rather than the recovered content;
fetching from the backup copy the first predetermined portion of the backup copy in full;
generating at least one of the pointer and stubs for the second predetermined portion of the backup copy;
providing one or more software applications accessing the recovered source file system a seamless recall on demand of an item of content within the second predetermined portion of the backup copy based upon the selection of an indication of the item of content within the one or more software applications and the at least one of the pointer and stub associated with the item of content.

In accordance with an embodiment of the invention there is provided a computer-implemented method of event-based retention where an explicit retention period is not applied to records within a remote storage until the trigger event, comprising the steps of:
defining an item-level WORM retention policy with the output retention set to 'event-based retention' from which the in-scope items will have a 'WORM pending' state established; wherein the WORM pending state makes the in-scope items immutable as if they had a specific retention period although no specific retention period has yet been applied;
triggering through a user interfaced retention of in-scope items; wherein the querying is performed using metadata enabled for event-based retention and upon triggering retention the user specifies an explicit retention period that is to be applied to the in-scope items;
monitoring for event based retention triggers; each event based retention trigger associated with a policy of a plurality of policies and having a minimum retention period associated with it; and
processing any items associated with now being in a triggered state to establish a retention period for retaining the item.

In accordance with an embodiment of the invention there is provided a computer-implemented method of detecting and tagging private/sensitive data as part of a policy evaluation process for archiving to cloud storage, comprising the steps of:
providing to a user a user interface enabling the user to define rules for data classification, identify source repositories, and set metadata-level rules relating to what content should be evaluated for possible archiving to cloud storage;
performing a crawl of the source repository with a first-level inspection process to identify only those items that meet the metadata-level policy criteria for inclusion and that are new/modified since the last crawl time;
performing a second-level inspection by fetching the inclusion items from the prior step, opening said items, rendering their text, and evaluating the private/sensitive data rules with regular expression pattern matching;
applying associated tags for each regular expression that is matched for items that meet private/sensitive data rules, apply the associated tag; and
performing a third-level inspection based on the output data classification tags from the prior step to determine whether an item is eligible for archiving to the cloud storage or not.

In accordance with an embodiment of the invention there is provided a computer-implemented method of immutable write once ready many (WORM) records retention management on public cloud storage, comprising the steps of:
creating a sub-netted, fully-managed, dedicated tenant deployment in public cloud infrastructure;
providing a user interface allowing the definition of item-level WORM policies that consist of selection criteria and output retention periods by a user;
evaluating during a process of writing items to the cloud storage each item against each WORM policy and the longest WORM retention period is used to set the retention time on item versions that meet the policies; and
optionally, deleting those items whose retention period has expired.

In accordance with an embodiment of the invention there is provided a computer-implemented method of synchronizing the source metadata and security access control lists to content that is ingested into cloud storage through drive shipping, comprising the steps of: writing drive shipped content to a cloud storage account;
ingesting the data from the cloud storage account into a cloud archive storage account with a special write operation such that whilst there is a blob written its correct metadata blob is not yet available and hence no item version records are created that correspond to the blob record;

deleting each blob from the source cloud storage once it is written to cloud storage archive account;

configuring with a domain account with read/write access a 'blobless' mode connector setting for data that has already been ingested through the drive shipping method; wherein no blobs are staged during ingestion although a hash value is computed for the blob and passed in the blob metadata associated with the item version metadata information; and a deduplication algorithm results in the source/original item version metadata being mapped and recorded for the blob records already ingested via drive shipping.

In accordance with an embodiment of the invention there is provided a computer-implemented method of anti-virus scanning cloud block blob storage with quarantining of infected items, comprising the steps of establishing an anti-virus engine within a virtual machine and executing an application to fetch items from a cloud storage and submit the items to the anti-virus engine for scanning.

In accordance with an embodiment of the invention there is provided a method comprising: establishing a cloud computing platform to form a cloud based share;

establishing a retrieval server in communication with the cloud based share via a first network and a a share via a second network;

identifying a file for transfer to the cloud based share stored upon the share;

copying the file to the cloud based share;

creating a seamless stub for the file upon the retrieval server relating to the stored file upon the cloud based server; and renaming the original file in the CIFS share or NFS share to a predetermined file type which acts as a link based stub for the file which points to the seamless stub on the retrieval server.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
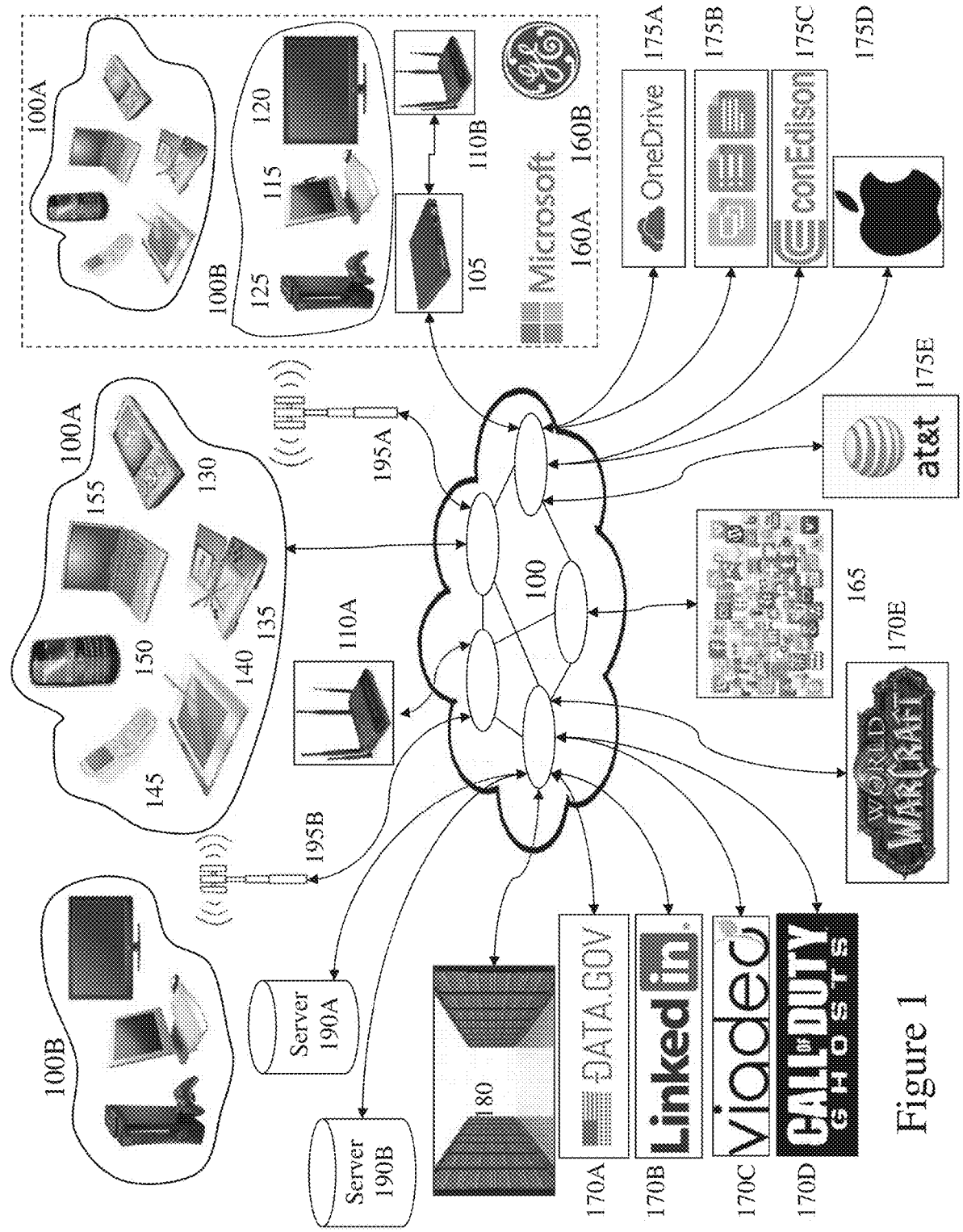
FIG. 1 depicts a network environment within which embodiments of the invention may be employed.

The present invention is directed to network and/or cloud based storage and more particularly to methods, processes, and knowledge worker interfaces for writing, managing, and classifying data to network and/or cloud storage including:

Leveraging an Archive or Storage Tier for Optimal File System Recovery;

Event-based Retention Management;

Performing Inline Data Classification During a Policy Evaluation Process for Archiving to Cloud Storage;

Providing Item-level Write Once Read Many Compliance Storage Policies in Cloud Storage;

Synchronizing Security Access Controls with Drive Shipping Content Ingestion to Cloud Storage; and Virus Scanning Content in Cloud Storage and Quarantining Infected Items.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" (also referred to as a "knowledge worker") as used herein may refer to, but is not limited to, an individual or group of individuals who may, but not limited to, monitor, acquire, store, transmit, process and analyse either locally or remotely to the user data within one or more databases. This includes, but is not limited to, private individuals, employees of organizations and/or enterprises, members of community organizations, members of charity organizations, men, women, children, and teenagers. In its broadest sense the user may further include, but not be limited to, software systems, mechanical systems, robotic systems, android systems, etc. that may, but not limited to, monitor, acquire, store, transmit, process and analyse either locally or remotely to the user data within one or more databases.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

Reference to a "human interface" or "user interface" as used herein may refer to, but is not limited to, any interface presenting to a type of interface that allows users to interact with electronic devices and/or systems directly and/or remotely. Today the most common user interface (UI) is a graphical user interface (GUI) that allows users to interact with electronic devices and/or systems through graphical icons and visual indicators such as secondary notation, as opposed to text-based interfaces, typed command labels or text navigation.

Reference to a "cloud" as used herein may refer to, but is not limited to, a model of ubiquitous, convenient, on-demand access to a shared pool of configurable computing resources via a network such as the Internet. As such the "cloud" may refer to an application, platform, and/or infrastructure remotely hosted from the user but accessible through a network. As such the cloud may refer to, but not be limited to, cloud computing, cloud servers, cloud (operating system), and cloud storage.

Reference to a "network", more formally a telecommunications network, communications network, computer network or data network, as used herein as used herein may refer to, but is not limited to, a telecommunications network which allows nodes to share resources, transmit data to other local or remote devices, and receive data from other local or remote devices. Devices connected to the network exchange data using data links either between devices or via a combination or network elements (commonly called network nodes or nodes) including, but not limited to, network interfaces, repeaters, hubs bridges, switches, routers, modems, firewalls, local area networks, metropolitan area networks, trunk networks, backbone networks, computer servers, and computer storage. Connections between nodes are established using wired and/or wireless media. Probably the best known computer network is the Internet. Network computer devices that originate, route and terminate the data are examples of network nodes. Nodes can include hosts such as personal computers, smartphones, computer servers as well as networking hardware. Networks in addition to varying in the transmission medium used to carry their signals may also vary in the communications protocols that organize network traffic, the network's size, topology and organizational intent. In many instances, application-specific communications protocols are layered (i.e. carried as payload) over other more general communications protocols.

Reference to "storage", more formally a (data) storage device, as used herein as used herein may refer to, but is not limited to device for recording (storing) information (data). Storage devices may hold information, process information, or both. Storage devices that only hold information is a recording medium. Devices that process information (data storage equipment) may either access a separate portable (removable) recording medium or a permanent component to store and retrieve data. Electronic data storage requires electrical power to store and retrieve that data in either analog data and/or digital data formats on a variety of media including magnetic tape, magnetic disc, optical discs, and semiconductor devices (memory). Most electronically processed data storage media (including some forms of computer data storage) are considered permanent (non-volatile) storage, that is, the data will remain stored when power is removed from the device. In contrast, most electronically stored information within most types of semiconductor (computer chips) microcircuits are volatile memory, for it vanishes if power is removed. Data may be stored uniquely within storage or it may be replicated using one or more protocols such as archiving, backing up, and storage virtualization. Amongst storage virtualization approaches are Redundant Array of Independent Disks (RAID) which combines multiple physical disk drive components into a single logical unit for the purposes of data redundancy, performance improvement, or both using different schemes, or data distribution layouts, which each provide a different balance among the key goals: reliability, availability, performance, and capacity. The concepts of RAID are extended to computer servers within data centers and alike and the distribution of data across multiple storage device can be managed either by dedicated computer hardware or by software. A software solution may be part of the operating system, part of the firmware and drivers supplied with a standard drive controller (so-called "hardware-assisted software RAID"), or it may reside entirely within the hardware RAID controller.

Reference to a "thick UI", "thick client" etc. as used herein may refer to, but is not limited to, an element, e.g. a UI or computer (client), which typically provides rich functionality independent of a central and/or remote server to which the UI and/or client relates.

Reference to a "thin UI", "thin client" etc. as used herein may refer to, but is not limited to, an element, e.g. a UI or computer (client), which typically has high dependency upon a central and/or remote server to which the UI and/or client relates in order to provide rich functionality.

Reference to a "connector" as used herein may refer to, but is not limited to, a technology solution for connecting application servers and information systems etc. Accordingly, a "Connector" may define a software application compliant with a standard for connecting an application server to an information system or a software application forming part of another application in execution upon a server, client, information system etc. that operates by a defined standard a standard set of system-level contracts, for example between an application server and a resource adapter. Such connector standards including, but not limited to, Java Connector Architecture, Java Database Connectivity, and Java EE Connector Architecture.

Reference to a "blob" as used herein may refer to, but is not limited to an item of data content associated with a cloud archive or cloud storage. A blob may refer therefore to an item of data content to be written to a cloud archive or cloud storage or an item of data content already written to a cloud archive or to cloud storage.

Reference to a "stub" or "stub file" or "pointer" as used herein may refer to, but is not limited to a computer file that appears to a user to be in a particular storage location and immediately available for use, but is actually held either in part or entirely on a different storage medium. Accordingly, when a user seeks to access a stub file the access is intercepted and the data retrieved from its actual location and stored, for example, within the stub file or in defined location etc. thereby allowing the user to access and employ the retrieved file. The process of "file stubbing" or "stubbing" as used herein may refer to, but is not limited to the act of creating stubs or stub files, within data storage systems including, but not limited to, those exploiting hierarchical storage management concepts.

Reference to a "share" or "network share" as used herein may refer to, but is not limited to a shared resource, or network share, made available from one host to other hosts on a computer network. It may include, but not be limited, a device or piece of information on a computer that can be remotely accessed from another computer, typically via a local area network or an enterprise intranet, transparently as if it were a resource in the local machine. Network sharing is made possible by inter-process communications over a network or networks. Such network or networks can include the Internet or the World Wide Web such that a share is accessible via authorised access anywhere globally and hence what is commonly referred to as a "cloud share" or "cloud storage".

Referring to FIG. 1 there is depicted a network environment 100 within which embodiments of the invention may be employed supporting remote storage systems, applications, and platforms (RS-SAPs) according to embodiments of the invention. The inventors have established such an RS-SAP commercially, referred to a RS-SAP™. Such RS-SAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with first and second Enterprises 160A and 160B respectively, such as General Electric™ or Microsoft™ for example, within which other first and second user groups 100A and 100B are disposed. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, cloud document service provider 170A, e.g. US Government open data portal Data.gov, first and second business networks 170B and 170C respectively, e.g. LinkedIn™ and Viadeo™, first to second online gaming communities 170D and 170E respectively, e.g. Call of Duty™ Ghosts and World of Warcraft™, as well as first and second servers 190A and 190B which together with others, not shown for clarity. Also connected are first and second cloud storage service providers 175A and 175B, e.g. Microsoft One Drive and Google docs, residential service provider 175C, e.g. ConEdison™, an online multimedia distributor 175D, e.g. Apple™, and telecom service provider 175E, e.g. AT&T. Accordingly, a user employing one or more RS-SAPs may through their avatar and/or avatar characteristics interact with one or more such providers, enterprises, and third parties.

First and second servers 190A and 190B may host according to embodiments of the inventions multiple services associated with a provider of remote storage systems, applications, and platforms (RS-SAPs); a provider of a SOCNET or Social Media (SOME) exploiting RS-SAP features; a provider of a SOCNET and/or SOME not exploiting RS-SAP features; a provider of services to PEDS and/or FEDS; a provider of one or more aspects of wired and/or wireless communications; an Enterprise 160 exploiting RS-SAP features; license databases; content databases; image databases; content libraries; customer databases; websites; and software applications for download to or access by FEDs and/or PEDs exploiting and/or hosting RS-SAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides RS-SAP features according to embodiments of the invention; execute an application already installed providing RS-SAP features; execute a web based application providing RS-SAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
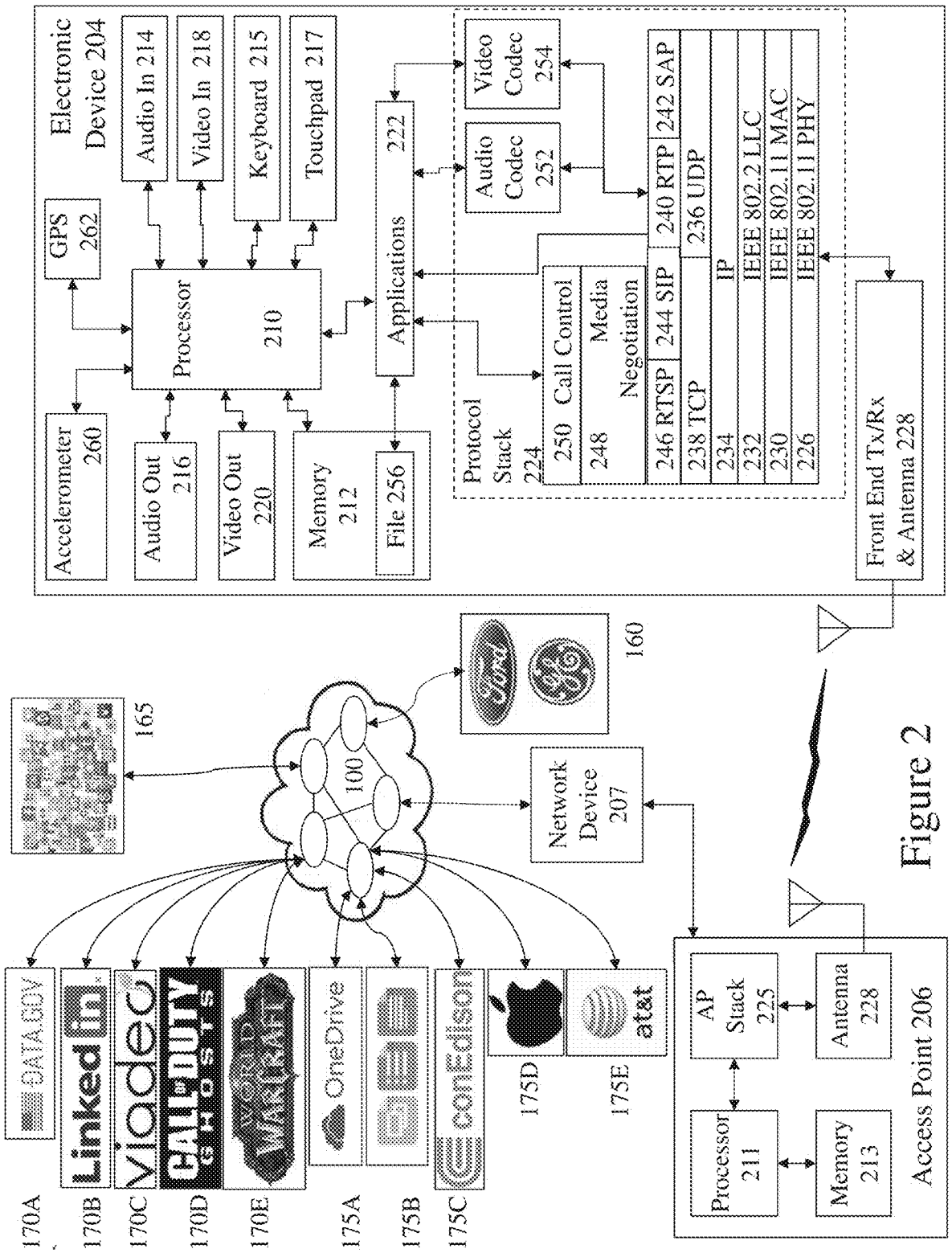
FIG. 2 depicts a wireless portable electronic device supporting communications to a network such as depicted in FIG. 1 and as supporting embodiments of the invention.

Now referring to FIG. 2 there is depicted an electronic device 204 and network access point 207 supporting RS-SAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, Also connected to the network 100 are Social Networks (SOCNETS) 165, cloud document service provider 170A, e.g. US Government open data portal Data-.gov, first and second business networks 170B and 170C respectively, e.g. LinkedIn™ and Viadeo™, first to second online gaming communities 170D and 170E respectively, e.g. Call of Duty™ Ghosts and World of Warcraft™ Also connected are first and second cloud storage service providers 175A and 175B, e.g. Microsoft One Drive and Google docs, residential service provider 175C, e.g. ConEdison™, an online multimedia distributor 175D, e.g. Apple™, and telecom service provider 175E, e.g. AT&T.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

The embodiments of the invention described in respect of FIGS. 1 to 10 are described with respect to their integration within a Hub Stor™ RS-SAP such as described by the inventors within U.S. patent application Ser. No. 15/346,094 filed Nov. 8, 2016 entitled "Methods and Systems Relating to Network Based Storage" the entire contents of which are herein incorporated by reference.

Those skilled in the art will appreciate that computer systems described above in respect of FIGS. 1 and 2 and below in respect of FIGS. 3 to 10 are merely illustrative and are not intended to limit the scope of the present invention. Such computer systems may be connected to other devices that are not illustrated, including through one or more networks such as the Internet or via the World Wide Web (WWW). In addition, the functionality provided by the illustrated components may in some embodiments be combined in fewer components or distributed in additional components. Similarly, in some embodiments the functionality of some of the illustrated components may not be provided and/or other additional functionality may be available.

Further, whilst filters and software components, for example, are illustrated as being stored in memory while being used, these items or portions of them can be transferred between memory and other storage devices for purposes of memory management and data integrity. Similarly, items illustrated as being present on storage while being used can instead be present in memory and transferred between storage and memory. Alternately, in other embodiments some or all of the software modules may execute in memory on another device. Some or all of the described components or data structures may also be stored (e.g., as instructions or structured data) on a computer-readable medium (e.g., a hard disk, a memory, a network, or a portable article to be read by an appropriate drive), and can be transmitted as generated data signals (e.g., as part of a carrier wave) on a variety of computer-readable transmission mediums (e.g., wireless-based and wired/cable-based mediums). In addition, a "client" or "server" computing device may comprise any combination of hardware or software that can interact, including computers, network devices, internet appliances, PDAs, wireless phones, pagers, electronic organizers, television-based systems and various other consumer products that include inter-communication capabilities. Accordingly, the present invention may be practiced with other computer system configurations.

Within the following descriptions with respect to features and/or systems and/or processes according to embodiments of the invention there are three elements that recur:

1. The RS-SAP (e.g. HubStor™) cloud data repository, which houses the data stored within the cloud by the user, parties associated with a user, third parties etc.
2. A ConnectorService which is an operating system (e.g. Microsoft™ Windows™ Linux™, MAC OS™) service that runs processing for one or more connectors which are identify by machine name. Within an embodiment of the invention each ConnectorService connects to the RS-SAP (HubStor™) in the cloud and has its own "thick" UI which is used to configure all settings and all connectors used by the ConnectorService (wherein this configuration is still stored in the RS-SAP (e.g. HubStor™) cloud database.
3. Connector(s) which are individually each a single instance capable of scanning and synchronising a data source (i.e. Exchange, SharePoint, file servers, etc.) to the RS-SAP on a policy based basis. Accordingly, connectors are focused on providing very basic functionality whilst the requisite logic is in the ConnectorService. Within an embodiment of the invention the basic functionality the Connector needs to support includes, but is not limited to, get root location, get sub-locations, get items in location, and get an identifier, e.g. HSItem, for an item.

1. Optimal File System Recovery Problem Via Archive/Storage Tier Leveraging

Embodiments of the invention relate to enterprise data backup and recovery and a new method of efficient recovery for file systems. Traditionally, backup systems will make a copy of whatever is on the source system, and in a recovery scenario, the backup system will recover the full copy onto the source system. However, source systems (in this case, enterprise file systems) are known to contain 80-90% inactive data. This means that 80-90% of a restore job is spent recovering old data that is important, but not mission critical in an immediate recovery objective.

The problem is exacerbated as companies look to use the cloud as an offsite data protection for their backups. If the backup is restoring the entire copy in a recovery scenario, not only does the customer pay for all the data transfer and storage activity in cloud economics to fetch the large backups containing mostly old data, but they also incur the large hit on their network connection to download the backup.

Within the prior art this is addressed by having the backup software keep a local cache of the most recent backups. Then, as the backups age, the backup software will tier the backups to the cloud. However, there are two problems with this approach:

1) It requires the organization to carve out and maintain storage for the recent backups (capital expenditure, administrative overhead), and
2) It doesn't deal with the problem of the 80-90% inactive data and how it is inefficient to restore this in a recovery. If the customer has to fetch a backup from the cloud, they will incur significant costs and network bandwidth consumption to pull down all the old data.

Embodiments of the invention exploit an RS-SAP, for example HubStor™, which currently offers customers a seamless storage tiering method to help remove the inactive data from their primary storage. This method tiers old data to a cloud storage archive based on policies and replaces the old data in the original file system location with a pointer or stub. If a user or application opens the item from the stub, a transparent recall mechanism fetches it from the archive. The user interacts with the content in the same way as usual without being aware of the background stub handling and data recover. Further, HubStor™ synchronizes up any item version changes into the archive, keeping a point-in-time record of the source system similar to a backup.

This seamless storage tiering enables organizations to significantly shrink their primary storage footprint without disrupting users or applications. Customers can continue to run their traditional backup software; in which case the backup is significantly smaller because 80-90% of it is now pointers for the old data. However, as will become evident, with the HubStor™ innovative recovery methods according to embodiments of the invention, such traditional backups become redundant.

Accordingly, HubStor™ provides an archive system or secondary storage tier; however, like a backup, it captures a point-in-time snapshot of the source system on a regular schedule. In essence, HubStor™ maintains a synthetic full backup: In each snapshot/crawl of the source file system, the incremental changes (any changes to security Access Control List (ACL), folder structures, item versions, new items) are merged into the archive/secondary storage tier. Then, in a data loss scenario on the source file system, HubStor™ will offer the administration user(s) the option of recovering a portion of the dataset from the archive/secondary storage tier as full originals and another portion of the dataset as pointers/stubs.

Beneficially, unlike a traditional backup, this methodology means we are not recovering whatever we have backed up. Instead, we have the flexibility to generate pointers/stubs for any portion of the dataset in the recovery scope. This has the following advantages:

1) The organization can avoid massive input/output (I/O) hit on the source file system storage array which would normally be incurred as a result of loading the full dataset back to the source file system;
2) The organization has a shorter recovery time objective (RTO) as HubStor™ is, for example, only loading back the most recent data (e.g. that which was touched in the most recent two weeks) and the remainder of the dataset is represented as pointer items;
3) In the case of recovery from the cloud, the organization does not incur large hits on network bandwidth or cloud costs in storage activity and data transfer. Again, only the most recent data is being download from the cloud archive/storage tier, and the software running on premise from which the recovery job is initiated is then generating pointers for all the rest.

Figure 3:
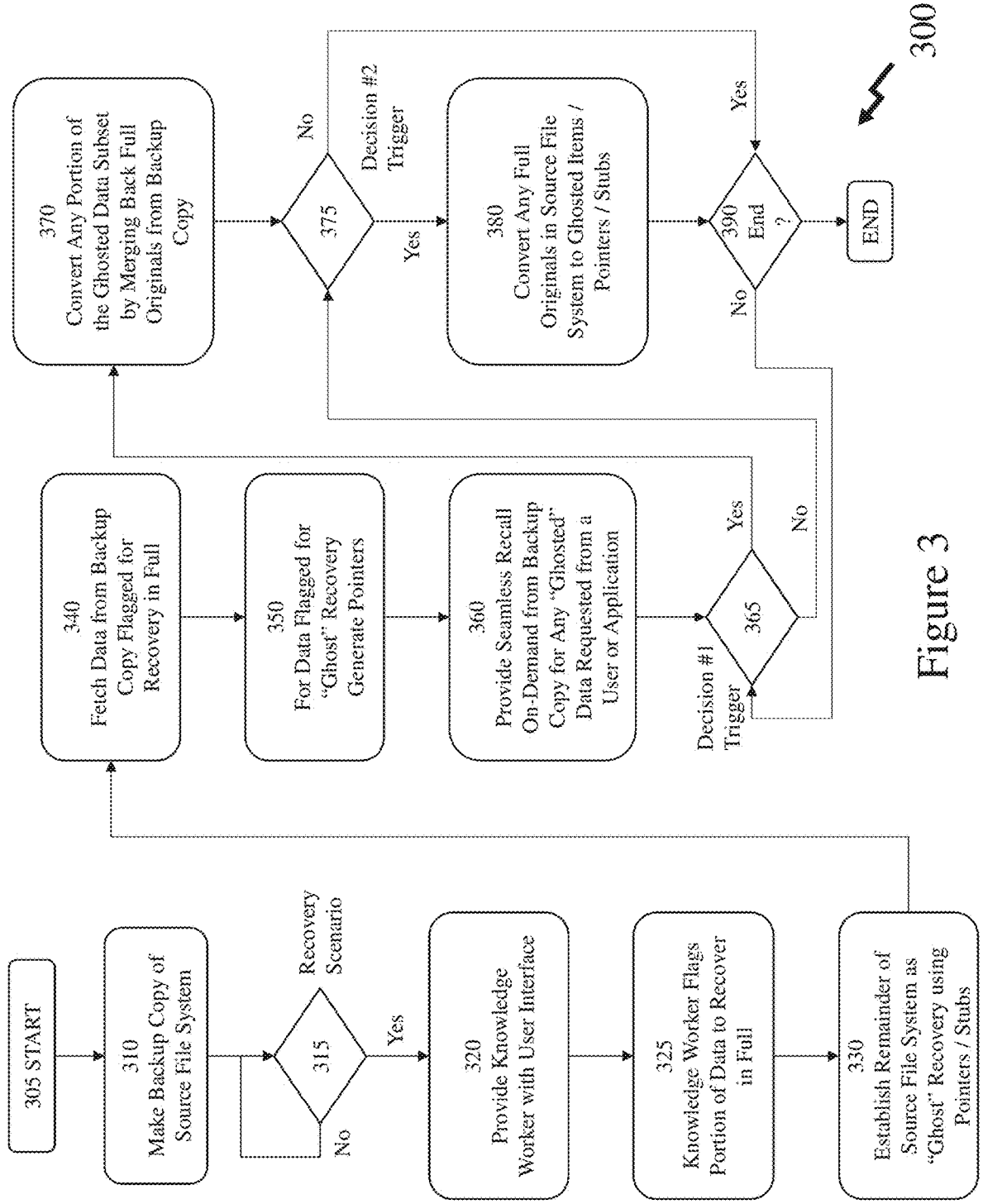
FIG. 3 depicts an exemplary flow diagram 300 for a computer-implemented method of recovering unstructured data sets whereby only the active data is recovered in full and the inactive data is ghosted according to an embodiment of the invention.

Accordingly, referring to FIG. 3 there is depicted an exemplary flow diagram 300 for a computer-implemented method of recovering unstructured data sets whereby only the active data is recovered in full and the inactive data is ghosted. As depicted the process comprises a first portion of process flow 300 comprising steps 305 to 360 before a second portion based upon subsequent triggers comprises steps 365 to 390. Accordingly, the first portion beginning at step 305, comprises:

Step 310: Make a backup copy of the source file system;
Step 315: Is a recovery scenario triggered wherein if yes the process proceeds to step 320 otherwise it loops back;
Step 320: In a recovery scenario, the RS-SAP provides the user with a graphical user interface (GUI);
Step 325: The RS-SAP GUI enables a user to decide (flag) what portion of the source file system (data) should be recovered in full;
Step 330: The RS-SAP then establishes the remainder of the source file system as "ghost content" or "ghosted content" recovery wherein the remainder of the source file system will be covered using pointers and/or stubs;
Step 340: During the recovery operation, the RS-SAP fetches from the backup copy the data that needs to be recovered in full;
Step 350: Data then flagged as "ghosted" is not recovered but the RS-SAP generates the pointers and/or stubs for this ghosted portion of the data; and
Step 360: The RS-SAP now provides seamless recall on demand from the backup copy for any ghosted data requested from a user application.

The second portion of process flow 300 relates to subsequent post-initial recover and comprises steps 365 to 390. These steps comprising:

Step 365: A first trigger decision is evaluated wherein a positive decision relating to a seamless recall being triggered from a ghosted pointer and/or stub the process proceeds to step 370 otherwise it proceeds to step 375;
Step 370: Wherein any portion of the ghosted data subset now on the source file system is converted by merging back full original(s) from the backup copy as identified by the pointers and/or stubs selected within the application(s) employed by the user(s);
Step 375: A second trigger decision is evaluated wherein a positive decision relating to a seamless conversion of full originals in the source file system to ghosted items/pointers/stubs the process proceeds to step 380 otherwise it proceeds to step 390;
Step 380: Wherein any full originals in the source file system are converted to ghosted items/pointers/stubs; and
Step 390: A decision whether to end or not process flow 300 is made wherein if the decision is to end the process proceeds to terminate otherwise it loops back to step 365.

It would be evident to one of skill in the art that the above concept may be applied to recovery from any on-premises or cloud-based backup, archive, or secondary storage mechanism.

Whilst a recovery file system has been described as a backup the concept may be applied to an archive wherein the entire archive is associated with the second portion and hence is tagged by ghosted pointers and/or stubs. This may be a local backup or archive, or a cloud backup or archive, or any secondary storage tier residing in public cloud infrastructure, flash storage, disk storage, or tape storage, for example.

2. Method of Event-Based Retention Management

Organizations generally must comply with regulatory requirements to preserve records for a defined period of time after a specific event. Accordingly, they require an efficient method of managing this retention within their cloud storage just as they do upon their local in-house storage systems. Accordingly, the inventors establish records (data) to be immutable from its time of archival as the exact retention period may not be known for the data until a triggering event occurs whereby a specific retention period can be assigned to the associated record(s).

Figure 4:
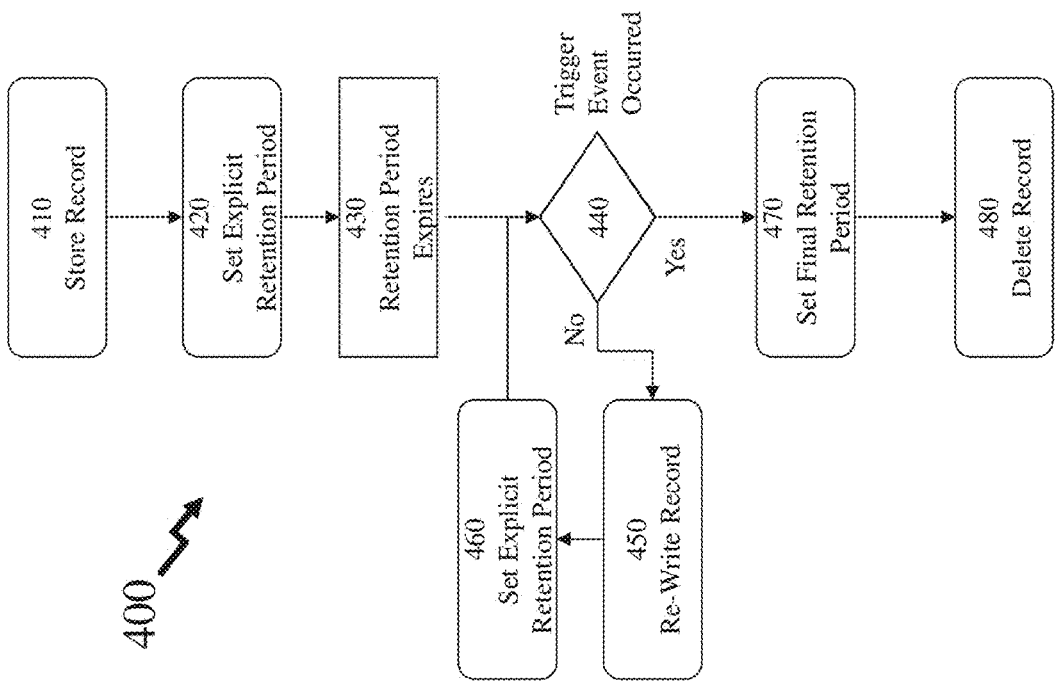
FIG. 4 depicts a prior art event-based retention methodology in write once read many (WORM) compliance storage and records management software.

Existing prior art event-based retention designs in write once read many (WORM) compliance storage and records management software all set an explicit retention period even when the records need to be preserved based on a trigger event. Such prior art methods, such as depicted in FIG. 4, ensure record retention until the final event-based retention can be set by periodically re-writing the records to a new folder with a new retention period. This process repeats until the event trigger occurs and the final event-based retention period can be applied. However, absent any automated process within cloud storage the re-writing of content to set a new retention period is a manually intensive and error prone operation.

The inventors introduced the concept of WORM retention and item-level retention periods within a cloud archive. For data that must be preserved with event-event decision making, embodiments of the invention provide for the concept of retention where item versions are in a "WORM pending" state. This means that the items do not have an explicit retention period defined when initially written/archived. However, in setting "WORM pending" a minimum retention period can be defined that specifies the minimum clock that can be set when an explicit retention period is eventually specified. Items that are in a "WORM pending"' state are immutable records and an explicit retention period will not be defined for them until a trigger event occurs for the event-based retention.

Accordingly, referring to FIG. 4 there is depicted a process flow 400 according to the prior art comprising steps 410 to 480 comprising:

Step 410: Wherein a record is stored within an archive;
Step 420: An explicit retention period is set;
Step 430: The explicit retention period expires;
Step 440: A determination is made as to whether a trigger event has occurred such that the process proceeds to step 470 upon a positive determination otherwise the process proceeds to step 450;
Step 450: Wherein the record is re-written;
Step 460: A new explicit retention period is set;
Step 470: A final retention period is set; and
Step 480: Upon expiration of the final retention period the record is deleted.

Figure 5:
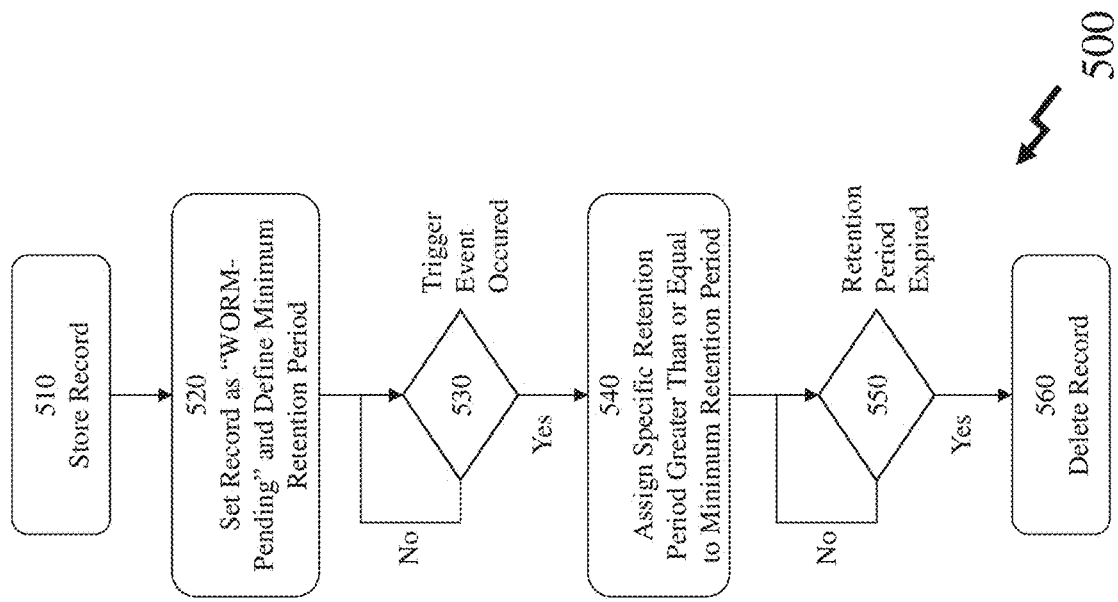
FIG. 5 depicts an exemplary process flow for a computer-implemented method of event-based retention according to an embodiment of the invention.

Now referring to FIG. 5 there is depicted an exemplary process flow 500 for a computer-implemented method of event-based retention according to an embodiment of the invention wherein an explicit retention period is not applied to records until a trigger event occurs. This process flow 500 comprising:

Step 510; Wherein a record is stored within an archive;
Step 520: Set Record as "WORM-Pending" and Define Minimum Retention Period;
Step 530: Wherein a trigger event determination decision is made wherein if the trigger event has occurred the process proceeds to step 540 otherwise it loops back;
Step 540: Based upon the trigger event occurring, a specific retention period is defined which is equal to or greater than the minimum retention period;
Step 550: Wherein an expiration determination decision is made wherein if the retention period has expired the process proceeds to step 560 otherwise it loops back; and
Step 560: The record is deleted.

Figure 6:
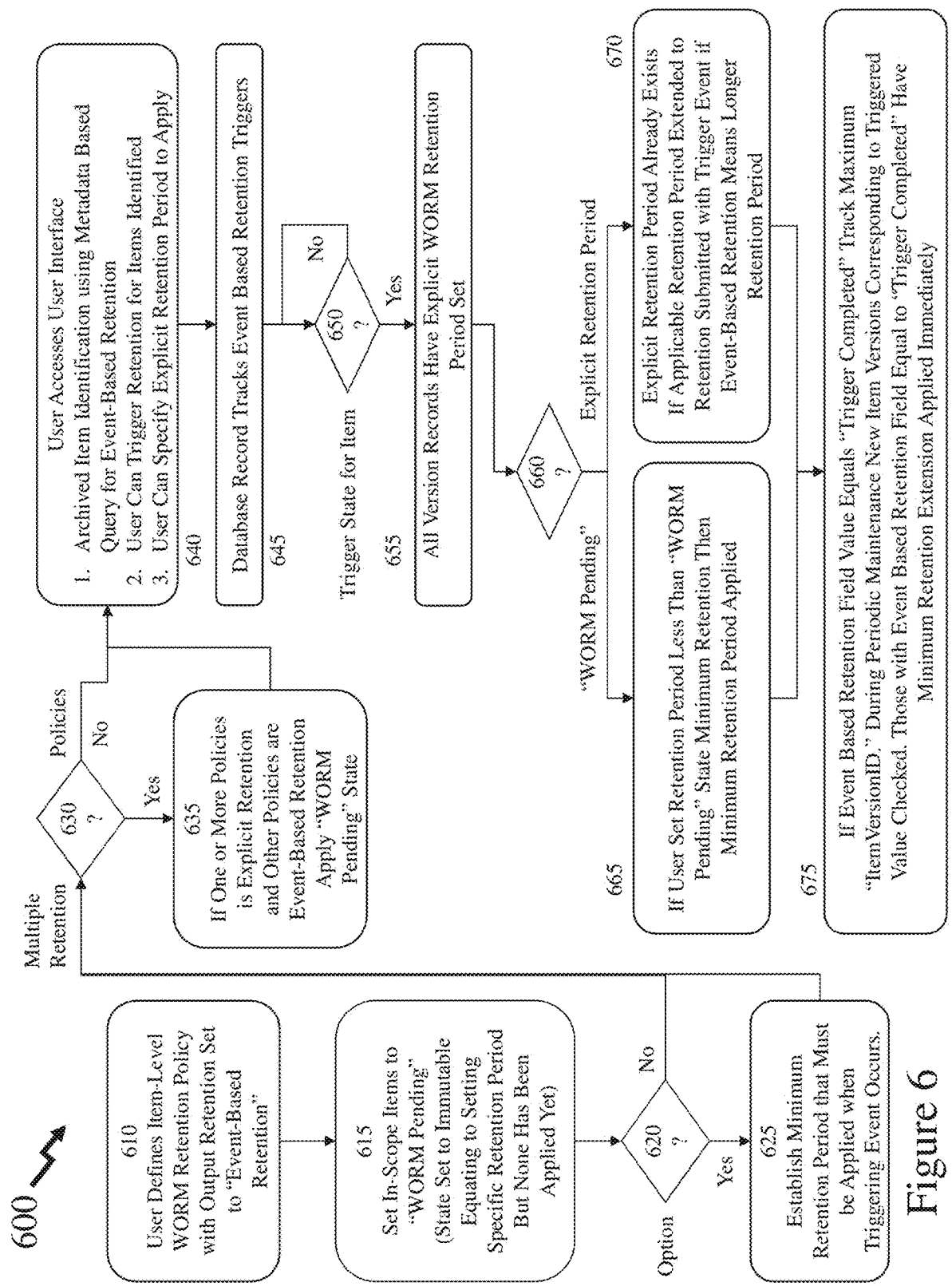
FIG. 6 depicts an exemplary process flow for a computer-implemented method of event-based retention according to an embodiment of the invention wherein an explicit retention period is not applied to records until a trigger event occurs.

Now referring to FIG. 6 there is depicted an exemplary process flow 600 for a computer-implemented method of event-based retention according to an embodiment of the invention wherein an explicit retention period is not applied to records until a trigger event occurs. As depicted, process flow 600 comprises steps 610 to 675. Considering initially steps 610 to 635 then these comprise:

Step 610: Wherein a user defines, for example through a RS-SAP GUI or RS-SAP process, an item-level WORM retention policy with the output retention set to "event-based retention";
Step 615: Wherein items are set to have a "WORM pending" state. The WORM pending state makes the records immutable as if they had a specific retention period, but no specific retention period has yet been applied.
Step 620: Wherein a decision is made as to whether an optional step of establishing a minimum retention period is to be employed or not wherein the process proceeds to step 625 if it the option is to be set otherwise the process proceeds to step 630;
Step 625: The option is selected and accordingly the item(s) have an output event-based retention which has a minimum retention period that must be applied when the triggering event occurs;
Step 630: Wherein a determination is made as to whether an item is subject to or meets multiple item-level WORM retention policies and proceeds to step 635 upon a positive determination and step 640 otherwise; and
Step 635: The multiple policies are evaluated and reconciled. For example, one policy is an explicit retention and the other is event-based retention then the event-based retention's "WORM pending" state will be applied to the item even if it has a minimum retention that is shorter than the explicit retention period of the other policy(ies).

Now considering steps 640 to 675 then these comprise:

Step 640: A user accesses a GUI of the RS-SAP which allows the user to:
  query items in the archive using metadata that is enabled for event-based retention;
  upon issuing a query and seeing results, the user can trigger retention for the items; and
  when triggering retention, the user can specify the explicit retention period that is to be applied.
Step 645: A database record tracks event based retention triggers; and
Step 650: The database is evaluated by a maintenance job process, e.g. an hourly maintenance job that processes any items that are now in a triggered state in steps 655 to 675 otherwise the maintenance job terminates until re-executed.

Optionally, monitoring for event based retention triggers exploits a database storing event based retention triggers in association with a policy of a plurality of policies to which the event based retention trigger relates. For example, a trigger may be an end of a financial period for a policy relating to quarterly financial reporting or the trigger is submission of statutory documents for a policy relating to regulatory compliance.

Now considering steps 655 to 675 these comprise:

Step 655: All item version records that have been triggered must have their explicit WORM retention period set;
Step 660: A decision is made as which of two options is executed depending on the existing WORM retention for an item version such that the process proceeds to step 665 if "WORM pending" is selected or step 670 if an explicit retention period is selected. In either instance the process then proceeds to step 675 once the selected step of step 665 or step 670 is executed;
Step 665—"WORM Pending" state—If the user's retention period input is less than the "WORM pending" state's minimum retention period, then the minimum retention period will be applied;
Step 670—Explicit retention period already exists—If the item already has a retention period from another policy, then, if applicable, the retention period will be extended to the retention submitted with the trigger event should the event-based retention period mean a longer retention duration. (Retention periods cannot be shortened by a trigger event, only lengthened.); and
Step 675: If an event-based retention field value is in the "Trigger Completed" state, then new content could still be ingested for that field value. Accordingly, the periodic (or aperiodic) maintenance job keeps track of the maximum "ItemVersionID" when it was last run. During each subsequent maintenance process, all new item versions corresponding to the triggered value are checked and if any are for event-based retention field value that is "Trigger Completed", the associated minimum retention extension is applied immediately.

3. Inline Private/Sensitive Data Classification During Policy Evaluation Process for Cloud Storage Archiving Organizations that store private/sensitive data often have legal or regulatory requirements against such data being stored in the public cloud. However, these organizations still wish to use the cloud to archive data that is eligible for cloud storage. The problem is not completely solved by performing a data classification exercise and then running archive rules to move certain data to the cloud because of the decoupled nature of these two processes. For example, between classifying data and moving it to the cloud, there is potential for new items/records (or modified items/records) to enter the scope of archiving that contain personally identifiable information (PII) or personal health information (PHI). If the organization were to accidentally store PII/PHI data in the cloud, it can be a breach of contract or regulation that would have significant potential of harming their business in a compliance audit or legal claim.

Currently, the inventors are unaware of any solution that evaluates items for PII rules synchronously within a cloud archiving process.

The inventor's innovative processes according to embodiments of the invention performs a synchronous data classification evaluation inside the policy-driven archiving process of items/records from source repositories (file systems, databases). The inline data classification during archiving provides a surefire method of ensuring PII/PHI does not enter the cloud. As inputs, the user can specify certain regular expression patterns that are to be searched for. Then, secondary inputs are whether content containing certain PII/PHI is to be tagged. And finally, a policy setting determines which PII/PHI types are allowed or disallowed from entering the scope of cloud archival.

The content scan for data classification would certainly reduce the performance of an archiving processes of an RS-SAP such as Hub Stor™ for example. However, the inventors leverage the incremental awareness of content in each source repository within Hub Stor™ as defined and discussed within the inventor's U.S. patent application Ser. No. 15/346,094 filed Nov. 8, 2016 entitled "Methods and Systems Relating to Network Based Storage." Such an incremental awareness of content in each source repository means that only new or modified items are inspected for PII/PHI rules. Furthermore, embodiments of the invention may further restrict evaluations to only examining content that fell into the scope of metadata-level policies in the initial scans, further reducing the scope of data classification scans overall and loading on the system. Accordingly, an embodiment of the invention may employ a single initial evaluation of the metadata of an item as it is unlikely that the classification of an item will change. However, in other embodiments of the invention the scans may be periodically repeated to ensure that metadata-level policies are being adhered to. Accordingly, an enterprise can adjust the level of content that must be fully inspected during archive activities.

Figure 7:
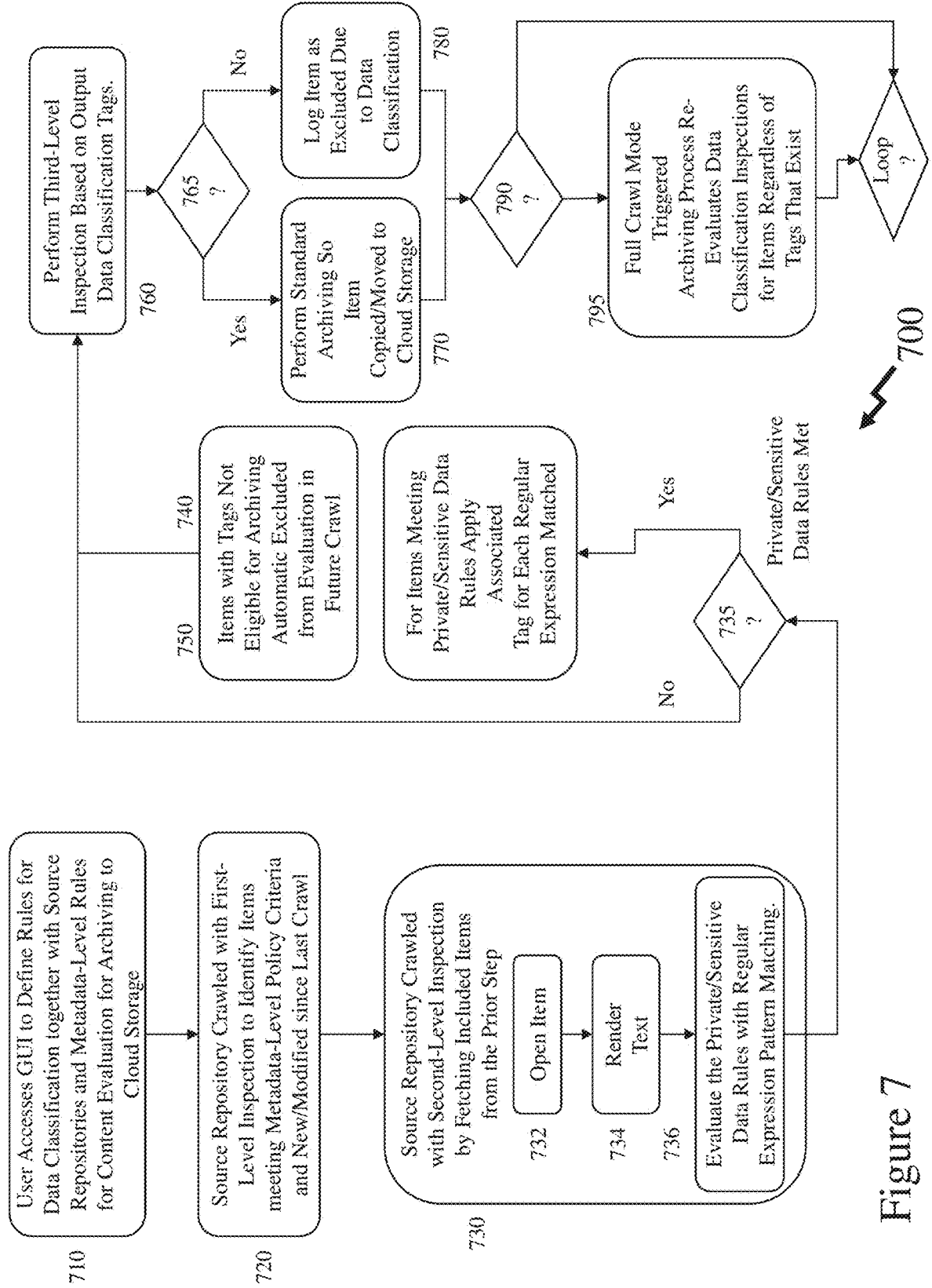
FIG. 7 depicts an exemplary process flow according to an embodiment of the invention for a computer-implemented method of detecting and tagging private/sensitive data as part of a policy evaluation process for archiving to cloud storage.

Now referring to FIG. 7 there is depicted an exemplary process flow 700 according to an embodiment of the invention for a computer-implemented method of detecting and tagging private/sensitive data as part of a policy evaluation process for archiving to cloud storage, comprising steps 710 to 790. Considering initially steps 710 to 735 then these steps comprise:

Step 710: A user exploits a GUI within an RS-SAP to define rules for data classification. These rules are regular expressions and their associated output tag(s). In addition, the user identifies source repositories and metadata-level rules for what content should be evaluated for possible archiving to cloud storage;

Step 720: The source repository/repositories are crawled with a first-level inspection to identify only those items that meet the metadata-level policy criteria for inclusion and that are new/modified since the last crawl time;

Step 730: The process performs a second-level inspection by fetching the inclusion items from step 720 and executing upon each a sub-process comprising steps 732 to 736 comprising:

Step 732: Open the item;

Step 734: Render the item's text; and

Step 736: Evaluate the private/sensitive data rules with regular expression pattern matching.

Step 735: Determine whether private/sensitive data rules met wherein if met the process proceeds to step 740 and then steps 750/760 otherwise it proceeds directly to step 760.

Now considering initially steps 740 to 735 of process flow 700 then these steps comprise:

Step 740: For items that meet private/sensitive data rules, apply the associated tag for each regular expression that is matched;

Step 750: For those items with tags not eligible for archiving then these are automatically excluded from evaluation in future crawl(s);

Step 760: Perform a third-level inspection based on the output data classification tags from the prior steps to determine whether an item is eligible for archiving to the cloud.

Step 765: Archiving eligibility where if eligible the process proceeds to step 790 via step 770 otherwise it proceeds to step 790 via step 780.

Step 770: Perform the standard archiving steps so that the item is copied/moved to cloud storage.

Step 780: Log that the item is excluded because of its data classification. In future crawls, items with tags not eligible for archiving are automatically excluded from evaluation.

Step 790: A determination is made whether to trigger a full crawl or not where a positive determination routes the process flow 700 to step 795 and therein to a loop determination and a negative determination routes the process directly to the loop determination.

Step 795: A full crawl can be triggered/forced so that the archiving process re-evaluates data classification inspections for each item regardless of the tags that might exist on the item.

4. Real-Time Item-Level Write Once Read Many (Worm) Compliance Storage Policies on Public Cloud Storage Organizations faced with regulatory requirements (Sarbanes-Oxley, SEC/FINRA Rule 17a-4, CFTC, FDA, etc.) to preserve records immutably are not able to defensibly use public cloud storage for write once ready many (WORM) compliant archiving. Furthermore, organizations need WORM retention policies to evaluate real-time during the writing process to apply retention periods to items meeting policy criteria. To the inventor's knowledge, there are no known methodologies within prior art public cloud storage that include the concepts of retention periods, policies, or records immutability.

Accordingly, the inventors provide a software layer and deployment model that enables customers to achieve WORM-compliant storage on public cloud storage. The software layer evaluates items against WORM retention policies where the potential output is a retention period applied at the item level during the write to cloud storage. The retention period mechanism in the software layer then prevents any deletion that may occur by a user or administrator until the retention expires. The deployment model is a single tenant in a managed account, thus removing any ability for the end customer to directly access any of the supporting cloud infrastructure and ensuring their access is strictly through the software layer which forces WORM-compliant preservation of records.

Figure 8:
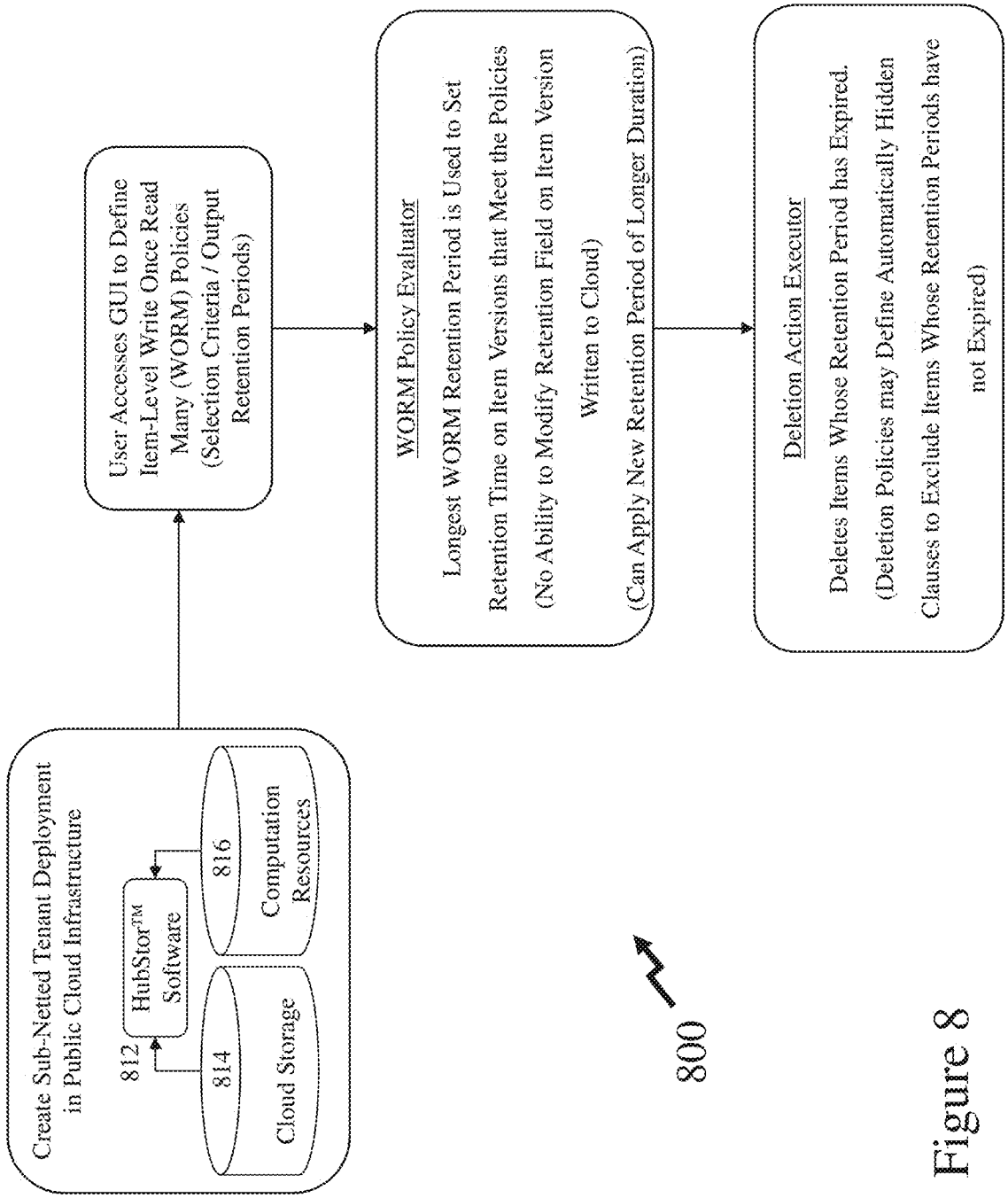
FIG. 8 depicts an exemplary process flow according to an embodiment of the invention for such a computer-implemented method of immutable write once ready many (WORM) records retention management on public cloud storage.

Accordingly, referring to FIG. 8 there is depicted an exemplary process flow 800 according to an embodiment of the invention for such a computer-implemented method of immutable write once ready many (WORM) records retention management on public cloud storage, comprising step 810 to 840 respectively. These steps comprise:

Step 810: A sub-netted, fully-managed, dedicated tenant deployment within a public cloud infrastructure is created consisting of:
Cloud storage resources 814;
Computation resources 816;
Software in execution upon the tenant system, for example Hub Stor™, providing cloud storage processes such as defined and discussed within the inventor's U.S. patent application Ser. No. 15/346,094 filed Nov. 8, 2016 entitled "Methods and Systems Relating to Network Based Storage.

Step 820: A user accesses a GUI within an RS-SAP, e.g. Hub Stor™, allowing them to define item-level WORM policies that consist of selection criteria and output retention periods;

Step 830: During the process of writing items to the cloud storage each item is evaluated using a WORM Policy Evaluator (WORM-PE). The WORM-PE evaluates each item against each WORM policy and the longest WORM retention period is used to set the retention time on item versions that meet the policies. It is assumed that there is no ability to modify the retention field on an item version once it has been written to cloud storage. Accordingly, a new retention period that is a longer retention duration may be applied in which case the retention time of the item is extended.

Step 840: The Deletion Action Executor (DEA) will not delete any items whose retention period has not expired. Furthermore, any deletion policies that a user may define automatically have a hidden clause added to exclude items whose retention period has not expired.

It would be evident that, optionally, item versions may have multiple retention periods, in which case the longest retention period effectively takes precedence while the shorter retention periods remain associated with the item for policy auditing purposes.

5. Security Access Control Synchronization with Drive Shipping Content Ingestion to Cloud Storage Public cloud vendors support a drive-shipping method of ingesting data into cloud storage whereby the customer physically ships a hard drive (or set of drives) to the cloud vendor, and the vendor performs the task of mounting the drive and writing the contents into a cloud storage account for the customer. This method of moving data into cloud storage is used to avoid impacting network bandwidth resources; however, the problem is that copying the data to a drive results in metadata modifications and a loss of the original security Access Control Lists (Security ACLs) on the items and folders.

At present within the art, the approach of drive shipping is known to result in a loss of Security ACLs and some of the original file metadata. This prevents self-service user access to content in cloud storage, and it negates features whereby access rights might be leveraged to isolate data for custodian-based legal hold, data classification, access rights analysis and governance, etc.

Figure 9:
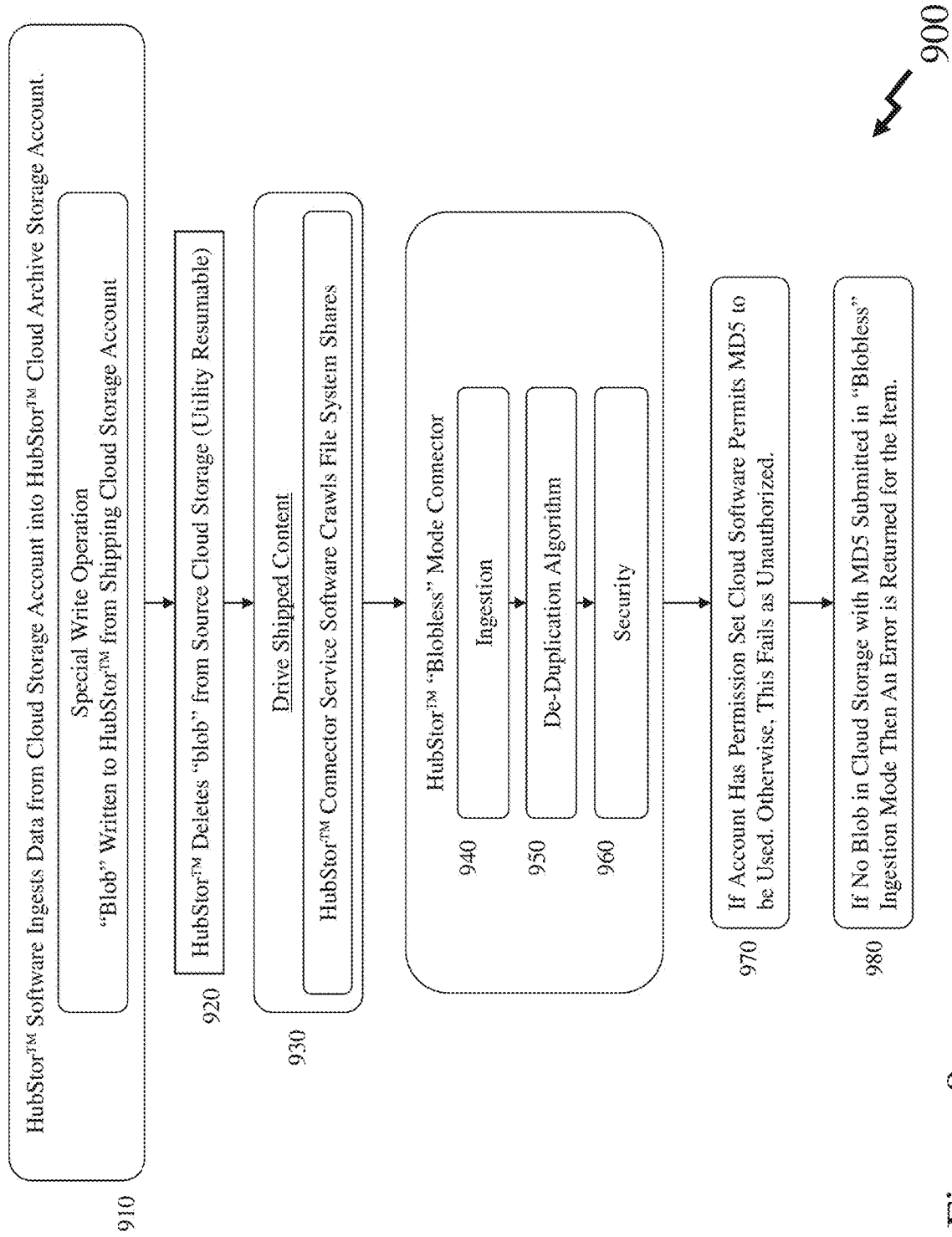
FIG. 9 depicts an exemplary process flow according to an embodiment of the invention for a computer-implemented method of synchronizing the source metadata and security access control lists to content that is ingested into cloud storage through drive shipping.

Accordingly, the inventors have established a methodology which can work with cloud vendor's drive shipping method as it subsequently synchronizes the Security ACLs and original metadata to the blobs ingested through a drive shipping process. Referring to FIG. 9 there is depicted an exemplary process flow 900 according to an embodiment of the invention for a computer-implemented method of synchronizing the source metadata and security access control lists to content that is ingested into cloud storage through drive shipping, comprising steps 910 to 990 respectively. As depicted steps 910 to 920 comprise:

Step 910: Drive shipped content is written to a cloud storage account. A RS-SAP, e.g. HubStor™, ingests the data from the cloud storage account into an RS-SAP cloud archive storage account. This is a special write operation since there is a blob written into RS-SAP but since it is known that the correct metadata for the blob is not yet available, no item version records are created that correspond to the blob record;

Step 920: Once a blob is written to the RS-SAP from the drive shipping cloud storage account, the RS-SAP deletes it from the source cloud storage. This deletion makes the utility resumable; and Step 930: For the drive-shipped content, the original data is network mounted in the customer's premises. RS-SAP connector service software is installed in the customer's premises and is configured with a domain account with read/write access to the share containing the target data. The RS-SAP's connector service software normally crawls file system shares to perform policy-based full capture of blobs, folder structures, item metadata, and Security ACLs to cloud storage.

However, within the drive shipping scenario according to embodiments of the invention the RS-SAP offers a "blobless" mode connector setting within the RS-SAP Connector Service which is software installed at customer premises which is configured with a domain account having read/write access to the share containing the source target data. The "blobless" mode connector is configured within the RS-SAP's connector service software specifically for data that has already been ingested through the drive shipping method. As depicted in FIG. 9, execution of the "blobless" mode connector setting comprises steps 940 to 960:

Step 940: Ingestion—wherein no blobs are staged during ingestion although a hash value (e.g. an MD5) is computed for the blob and passed in the blob metadata associated with the item version metadata information;

Step 950: Deduplication algorithm—will result in the item version metadata being mapped and recorded for the blob records already ingested via drive shipping;

Step 960: Security—the user account of the RS-SAP connector service software employed to authenticate and authorize with the RS-SAP cloud storage tenant requires special "Write Blobless Items" permission to be set.

Accordingly, the exemplary process flow 900 proceeds with steps 970 and 980 wherein:

Step 970: If the account has this permission, the software in the cloud will permit the hash value to be used. Otherwise, this will fail as unauthorized.

Step 980: If there is no blob in the cloud storage with a hash value submitted in the "blobless" mode of ingestion, then an error is returned for the item.

Accordingly, the exemplary process flow allows for the method of running a connector to allow all metadata, permissions, etc. to be associated with the blobs after their initial ingestion, i.e. separately from the blobs being ingested through drive shipping.

6. Cloud Storage Content Virus Scanning and Quarantining Infected Items

Organizations want to use cloud storage to backup and archive their data, but they also need to scan their content for viruses and malware. When storing data in block blob storage accounts, the content is not in a file system that Anti-Virus (AV) programs can natively scan. Whilst some cloud storage gateway products can scan for viruses as they push the data initially up to the cloud storage this only solves part of the problem. Namely it only verifies that the data uploaded was clean according to the virus definitions in effect at that point in time. The prior art solutions do not address or handle the requirement to periodically rescan the data residing in cloud storage with updated virus definitions either of the organization to whom the data belongs or the cloud storage provider. Thus, if either the remote storage provider or the owning organization updates their AV definition, they cannot proactively scan their cloud storage.

The inventors have established a methodology for an RS-SAP according to an embodiment of the invention that solves the problem of virus scanning content in cloud storage with a service that fetches content from the block blob storage accounts and submits them to any licensed anti-virus (AV) engine running in the cloud. If the AV engine detects an infected item version, RS-SAP will tag the item. The tag has the effect of immediately preventing user retrieval so that the infected item does not cause damage. The tag also provides a logical grouping which is used for dashboard reporting, analysis, identification, and policy-based extraction and deletion.

Figure 10:
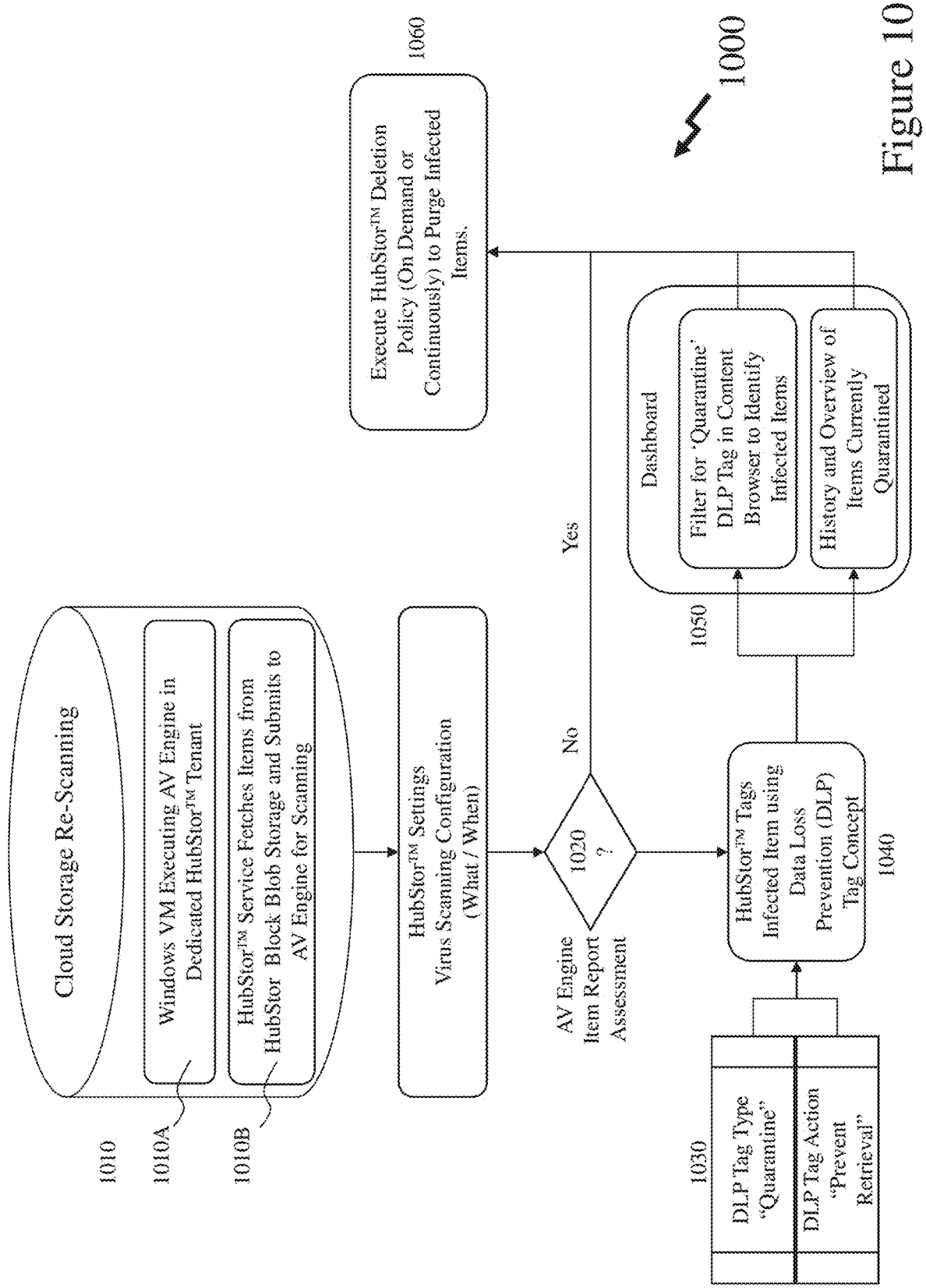
FIG. 10 depicts an exemplary process flow according to an embodiment of the invention with respect to a computer-implemented method of anti-virus scanning cloud block blob storage with quarantining of infected items.

Accordingly, referring to FIG. 10 there is depicted an exemplary process flow 1000 according to an embodiment of the invention with respect to a computer-implemented method of anti-virus scanning cloud block blob storage with quarantining of infected items. As depicted process flow 1000 comprises steps 1010 to 1080. These steps being:

Step 1010: Establishment of a cloud storage re-scanning system comprising:
  Step 1010A: Executing an AV engine within a virtual machine (VM), e.g. a Windows based VM. The VM being established within an organization's dedicated RS-SAP tenant, e.g. Microsoft™ Azure™; and
  Step 1010B: A RS-SAP service, e.g. HubStor™, would also run on this VM in order to fetch items from RS-SAP's block blob storage and submit them to the AV engine for scanning.

The RS-SAP, via a GUI, allows a user to set how often the virus scanning runs as well as providing configuration of what aspects of the cloud storage are scanned together with supporting the ability to initiate scanning on demand and initiate scanning of particular folders etc. The RS-SAP keeps track of the last time each item version was AV scanned.

Accordingly, based upon these settings the AV engine executes and generates an AV Engine Item Report. Based upon this the process flow 1000 continues with steps 1020 to 1080, these providing:

Step 1020: The AV engine item reports pass/fail to the RS-SAP fetch service for the items scanned wherein if there are infected items the process proceeds to step 1040 otherwise it proceeds to step 1070;

Step 1040: Infected items are tagged by the RS-SAP as infected using the Data Loss Prevention (DLP) Tag concept wherein DLP Tags are stored within a database 1030 together with the associated action of each tag. Accordingly, a new DLP Tag type entitled "Quarantine" may be established which has associated DLP tag behavior of "prevent retrieval.'" This means that once an item is identified as infected it is blocked from being opened;

Step 1050: A dashboard within the RS-SAP allows the user to filter for the "Quarantine" DLP Tag in the content browser to pinpoint the infected items or view a history/overview of the items quarantined or previously quarantined.

Step 1060: A RS-SAP deletion policy is executed, either on demand or continuously, which uses the "Quarantine" DLP Tag as its selection criteria such that infected items would then be purged. The RS-SAP would then upon a deletion automatically "promote" the last known good version in an item's version history to be the latest version.

In this manner, the RS-SAP quarantines an item identified as infected by the AV engine and rolls back to the last known virus free version for subsequent access by the RS-SAP in the event of a retrieval/access request.

Within an embodiment of the invention, systems and methods relating to a cloud storage repository's ability to provide knowledge workers with a human interface to data ingested from third-party systems that presents the data organized within its original folder contexts. Further, the embodiments of the invention provide for a method of determining what folder locations the knowledge worker will see in the human interface, e.g. a graphical user interface (GUI). Such third-party systems may relate to an organization and/or a plurality of organizations, a service provider and/or service providers, an enterprise and/or plurality of enterprises and/or other third-party databases, data repositories, etc. The knowledge worker, e.g. user, may access the human interface upon a PED, FED, wearable device or another electronic device.

Within an embodiment of the invention a system implementing it comprises:
  a cloud storage repository;
  a user directory synchronization service;
  at least one data source connector; and
  a human interface.

7. Storage Platform Generic Seamless Stubbing and Storage Tiering

The embodiments of the invention described in respect of FIGS. 1 to 10 are described with respect to their integration within a Hub Stor™ remote storage system, application, and platform (RS-SAP) according to embodiments of the invention such as described by the inventors within U.S. patent application Ser. No. 15/346,094 filed Nov. 8, 2016 entitled "Methods and Systems Relating to Network Based Storage" the entire contents of which are herein incorporated by reference.

The HubStor™ RS-SAP currently has a feature called seamless stubbing. This is a storage tiering feature which to date has been specific to systems exploiting Windows Server, brand name for a group of server operating systems released by Microsoft™, because it uses reparse points. Based on policy, Hub Stor™ converts original files into offline files. A Windows Server agent then monitors for any user or application requests on the file to open, and using the reparse points injects a retrieval to the alternate source (HubStor™) from which the file is retrieved and injected into the response. However, this retrieval is based upon the reparse points supported by the Windows Server which represents only a portion of the enterprise storage footprint. For many clients all or a large portion of their data is stored upon Common Internet File System (CIFS) and/or Network File System (NFS) based directories whereby desktops and applications connect directly to the storage controller of the storage array. Accordingly, there is no Windows Server that serves the networked storage mount points to users and applications.

In order to address this, the inventors have established a method of seamless stubbing in a secure manner without the requirement for network intercepts, client software, or an agent on the target storage appliance. Within the prior art CIFS storage shares do not support seamless stubbing since reparse points themselves are not supported and cannot execute the retrieval service on these machines as they do not support a Microsoft™ Windows environment. Accordingly, the inventors have established a new type of stubbing which they refer to as link-based stubbing where link based stubbing stubs are .lnk files, i.e. Microsoft™ Windows shortcuts, that point to a seamless stub residing on a retrieval server. The retrieval server is a Windows Server that has the Retrieval Service installed and services incoming stub retrievals (initiated through the remote lnk files) and has a share containing all of the seamless stubs pointed to by the .link-based stubs.

7.1 Link Stub Processes

Connector Service Stub Creation

Figure 11:
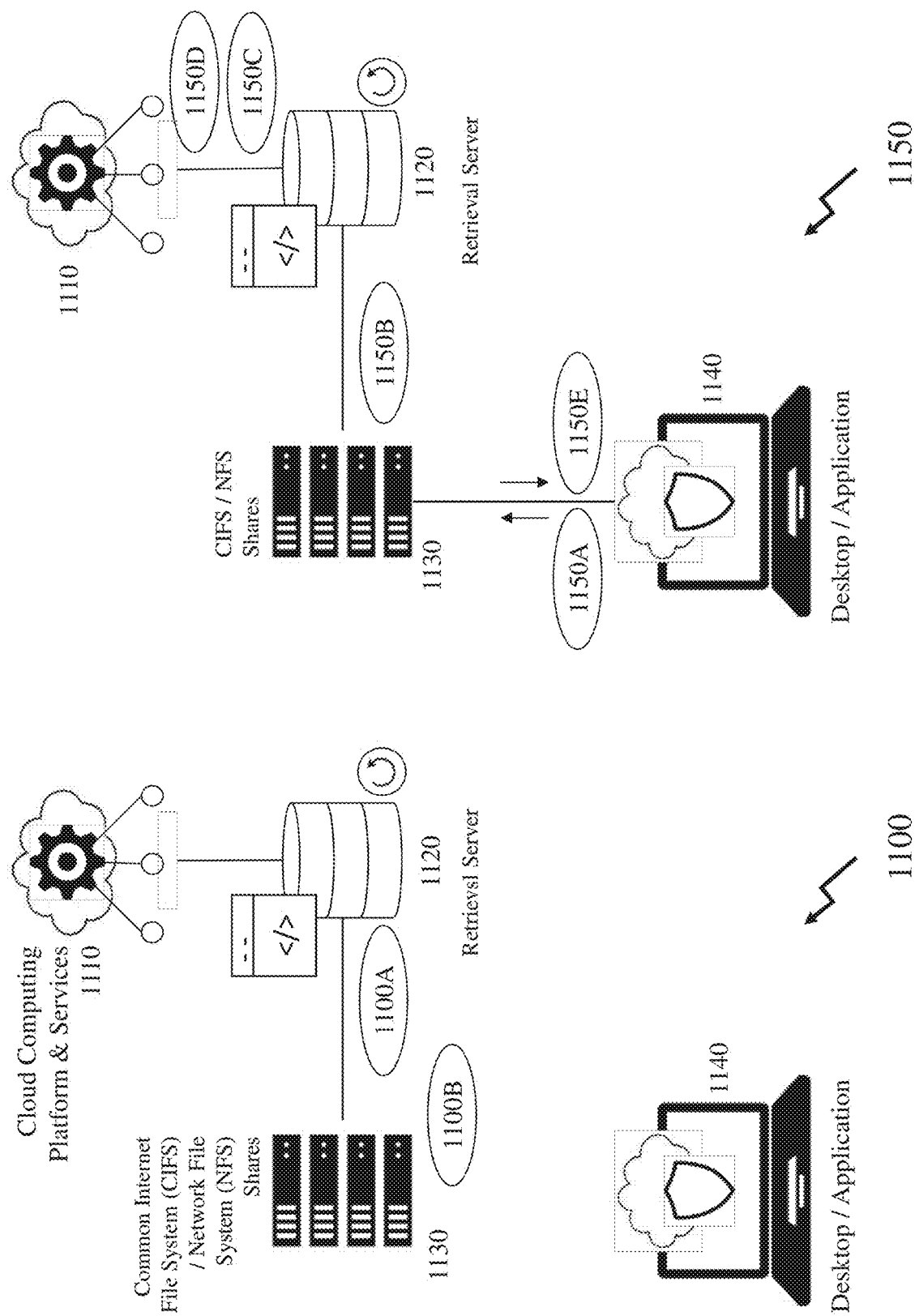
FIGS. 11 and 12 depict an exemplary process according to an embodiment of the invention with respect to a computer implemented method relating to seamless stubbing within non-windows environments.

Referring to FIG. 11 in first image 1100 is depicted the initial process of stub creation is depicted within a system comprising a Cloud Computing Platform & Services 1110 which is coupled to a Retrieval Server 1120, a CIFS/NFS share 1130, and a desktop/application 1140. Accordingly, the Hub Stor Connector Service (HCS) solution creates a link-based stub by a process comprising the following steps:

Step 1100A: wherein the HCS creates a seamless stub on the retrieval server that serves as the target for the link-based stub; and Step 1100B: wherein the HCS renames the original file within a CIFS/NFS directory being archived to a link based stub, a .lnk file, and replaces the content with the .lnk file content pointing to the seamless stub created on the retrieval server.

Stub Retrieval

Referring to FIG. 11 in second image 1150 there is depicted the next process of stub retrieval within the system comprising the Cloud Computing Platform & Services (CoCoPS) 1110 which is coupled to the Retrieval Server 1120, the CIFS/NFS share 1130, and the desktop/application 1140. When an end user opens a link-based stub either from Windows Explorer or from an application, the process is as follows:

Step 1150A: the end user via an application 1140 targets the .lnk file for opening directly via the CIFS share 1130 with an open request;

Step 1150B: wherein the .lnk redirects to the corresponding seamless stub on the retrieval server 1120;

Step 1150C: wherein the Retrieval Service on the retrieval server 1120 intercepts the seamless stub request and sends the retrieval request to the CoCoPS 1110, e.g. Hubstor™ StorSite web application with the security identifier (SID or SID number) of the requesting user;

Step 1150D: wherein the CoCoPS 1110 exploits web application authentication (AuthN) and authorization (AuthZ) processes for the request and ensures the identified user has access to the request item. If the AuthN and AuthZ processes verify the user/request so the blob is streamed back to the retrieval service; and Step 1150E wherein the requested file is retrieved and returned to user and opened by the target application.

Saving Changes to a Retrieved Stub

Figure 12:
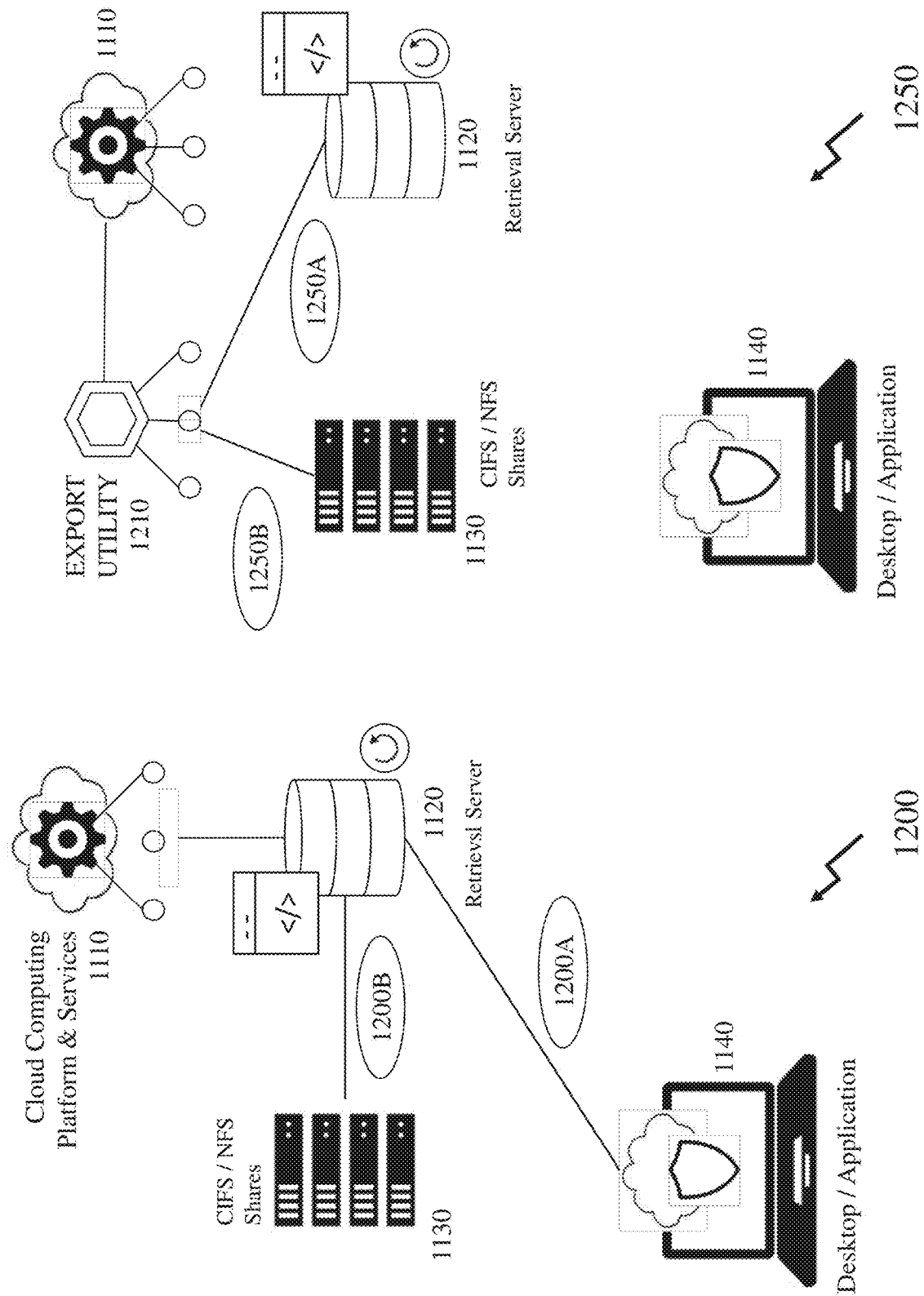

Referring to FIG. 12 in first image 1200 there is depicted a process step wherein the user modifies the retrieved item. This process step being performed upon the system comprising the Cloud Computing Platform & Services (CoCoPS) 1110 which is coupled to the Retrieval Server 1120, the CIFS/NFS share 1130, and the desktop/application 1140. When a user saves changes to a retrieved link-based stub, the following steps occur:

Step 1200A wherein the file is saved over the seamless stub on the retrieval server 1200A; and Step 1200B wherein the retrieval service file system watcher detects the saved file and moves it to the proper location in the CIFS/NFS share, overwriting any file which already exists and deleting the original link-based stub.

If the application still has the file open, then it is the file on the retrieval service that is open. Any subsequent saves will again overwrite the file on the retrieval service and the retrieval service file system watcher will copy the saved file back to the proper location where the link-based stub was located.

Export Utility Stub Restore

Referring to FIG. 12 in second image 1250 there is depicted a process step relating to stub recovery. This process step being performed upon the system comprising the Cloud Computing Platform & Services (CoCoPS) 1110 which is coupled to the Retrieval Server 1120, the CIFS/NFS share 1130, and the desktop/application 1140. When a stub restore is performed from the export utility, the following steps occur:

Step 1250A wherein the Export Utility 1210 creates a link based stub in the export destination CIFS/NFS directory; and Step 1250B wherein the Export Utility 1210 creates a corresponding seamless stub on the retrieval server 1120.

Retrieval Server Orphan Stub Cleanup

While not required initially, a later phase of the process of exploiting link stubs for CIFS/NFS is the requirement for the retrieval service to cleanup seamless stubs located in the stub share that reference items that have been removed, e.g. from HubStor™.

Retrieval Server Stub Share Structure and Security

The stub share is the location in the retrieval server where the seamless stubs (which are the target of the .lnk stubs) reside. This share can be expected to contain tens of millions of files, but all of which are small, e.g. 4 KB in size, as they are seamless stubs. Ideally, the directory should be organized based upon ItemVersionID similar to the Item Stor. This would ensure each individual NTFS folder has less that 16K items.

An "Everyone" user requires read access to all seamless stubs since any user can initiate a stub retrieval request. The "'Everyone' user should not have write or list directory permission. All accounts used by the HCS instances should have write access to the directory.

7.2 Link Stub Variations to Windows Server Only Retrieval Service Changes

Embodiments of the invention expand stub based processes through the addition of new "Act as Link-Based Stub Retrieval Server" options which allow CIFS and NFS shares to be employed in addition to those executing Windows Server operating systems. If "Act as Link-Based Stub Retrieval Server" is selected, the "Stub Share" option is exposed. This is configured with the path to the share into which the seamless stubs are written.

If "Act as Link-Based Stub Retrieval Server" is selected, the "Stub Share" path is automatically pushed up to the Hubstor™ database (HubDB) for the Hubstor™ StorSite. The file system watcher monitors the stub share for any non-stub files that get created. These are files that result from users saving stubs that they've opened. These saved files are moved back to the original location. When a file is moved, the corresponding link-based stub is removed. When a retrieval request is sent to the Hubstor™ StorSite Web Server (StorSiteWS) which has originated from the stub share, the flag is set to force the user being impersonated to be fully authorized to the given item version.

Connector Service Changes

The user account used to run the connector service is published into connector details in the HubDB. This may, for example, be within a Windows NT operating system environment wherein Windows NT by Microsoft™ is an example of a processor-independent, multiprocessing, multi-user operating system. The "Stub Share" path to the retrieval server stub share is retrieved for the StorSite the HCS connects to. Configuring a file connector exposes the new link-based stubbing option. Creating/detecting a link-based stub follows the above process.

StorSiteWS Changes

The retrieval request supports a flag to force full authorization of the impersonated user to the target file. Typically, this impersonated user is only used for auditing which is sufficient for seamless stubs but not for link-based stubs which require the full authorization.

Export Utility Changes

The export utility is able to recognize .lnk files as stubs. When restoring stubs, the .lnk file must be placed in the original location and the seamless stub is placed in the stubbing share on the retrieval server.

Zero-Configuration Notes

The ability of the HCS to publish the associated Windows NT account the service is running as, and the Hubstor Retrieval Service (HRS) to publish the stub share path when acting as a retrieval server. These allow the various components to automatically configure as needed. The HCS knows the retrieval server stub share path. The HRS knows the HCS accounts requiring write access to the stub share. The Export Utility 1210 knows the stub share path needed when restoring stubs.

7.3 File Extensions

The embodiments of the invention described supra in respect of FIGS. 11 and 12 change the file extension to .lnk. Accordingly, any applications that attempt to open the file using the original name will fail through this extension change. Further, the file extension changes will also break any embedded links to such files. Accordingly, using the process described and depicted supra only domain users who are included in the CoCoPS synchronization will be able to retrieve link-based files.

However, it would be evident that within other embodiments of the invention that an initial call for a file is intercepted by a software application that recognizes the share being called as being a CIFS or NFS share and accordingly the initial call is replaced with a modified call wherein the .lnk file extension is established. Alternatively, an initial call may be made and an initial fail leads to a subsequent call with a .lnk extension to check if the called file has been migrated from the CIFS or NFS share to a CoCoPS share. It would also be evident that other extensions may be established other than .lnk without departing from the scope of the invention.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method comprising: providing an electronic device comprising at least a microprocessor and a memory for storing computer executable instructions for execution by the microprocessor which when executed by the microprocessor configure the electronic device to perform a process comprising at least one of:
    recovering unstructured data sets whereby only the active data is recovered in full and the inactive data is ghosted;
    implementing an event-based retention where an explicit retention period is not applied to records within a remote storage until an event based retention trigger occurs; and
    detecting and tagging private/sensitive data as part of a policy evaluation process for archiving to cloud storage;
    wherein implementing an event-based retention comprises performing the steps of: executing a first process comprising:
    automatically determining that a record has been stored within an archive; automatically setting the record as write once read many pending "WORM-Pending"; and
    automatically defining a minimum retention period to the record; determining whether a trigger event has occurred; upon a positive determination performing a second process;
    upon a negative determination returning to determining whether a trigger event has occurred; and
    the second process comprises the steps of:
    defining and assigning to the record a specific retention period which is equal to or greater than the minimum retention period;
    determining whether an expiration event has occurred with respect to the record based upon at least the specific retention period; and
    upon a positive determination with respect to the expiration event deleting the record; and
    upon a negative determined returning to determine whether an expiration event has occurred.

2. The computer-implemented method according to claim 1, wherein
    recovering unstructured data sets whereby only the active data is recovered in full and the inactive data is ghosted comprises the steps of:
        generating a backup copy of the source file system;
        determining whether a recovery scenario is triggered;
        upon a positive determination executing the further steps of:

providing a user interface in a recovery scenario allowing a user to assign a first predetermined portion of the backup copy to be recovered in full and a second predetermined portion of the backup copy should be recovered as at least one of pointers and stubs to the content rather than the recovered content;

fetching from the backup copy the first predetermined portion of the backup copy in full;

generating at least one of the pointer and stubs for the second predetermined portion of the backup copy; and providing one or more software applications accessing the recovered source file system a seamless recall on demand of an item of content within the second predetermined portion of the backup copy based upon the selection of an indication of the item of content within the one or more software applications and the at least one of the pointer and stub associated with the item of content.

3. The computer-implemented method according to claim 1, further comprising converting a subset of the first predetermined portion of the backup copy within the recovered source file system to the second predetermined portion of the backup copy by converting full originals of the subset of the first predetermined portion of the backup copy to at least one of pointers and stubs.

4. The computer-implemented method according to claim 2, wherein generating a backup copy of the source file system comprises accessing an archive.

5. The computer-implemented method according to claim 2, wherein generating a backup copy of the source file system comprises accessing an archive; and the second predetermined portion of the backup copy is the entire archive.

6. The computer-implemented method according to claim 1, wherein implementing the event-based retention where an explicit retention period is not applied to records within a remote storage until the trigger event comprises the steps of:

defining an item-level write once read many (WORM) retention policy with the output retention set to 'event-based retention' from which the in-scope items will have a "WORM pending" state established; wherein the WORM pending state makes the in-scope items immutable as if they had a specific retention period although no specific retention period has yet been applied;

triggering through a user interface retention of in-scope items; wherein the querying is performed using metadata enabled for event-based retention and upon triggering retention the user specifies an explicit retention period that is to be applied to the in-scope items;

monitoring for event based retention triggers; each event based retention trigger associated with a policy of a plurality of policies and having a minimum retention period associated with it; and processing any items associated with now being in a triggered state to establish a retention period for retaining the item.

7. The computer-implemented method according to claim 6, wherein all item version records that have been triggered must have their explicit WORM retention period set.

8. The computer-implemented method according to claim 6, wherein the output event-based retention has a minimum retention period that must be applied when the triggering event occurs and if multiple item-level WORM retention policies are triggered where one policy is an explicit retention and the other is event-based retention then the event-based retention's 'WORM pending' state will be applied to the item even if it has a minimum retention that is shorter than the explicit retention period of the other policy.

9. The computer-implemented method according to claim 6, wherein for those items in a "WORM Pending" state if the user's retention period input is less than the "WORM pending" state's minimum retention period then the minimum retention period is applied.

10. The computer-implemented method according to claim 6, wherein if an explicit retention period already exists then the retention period is extended to the minimum retention period associated with the event based retention trigger triggered.

11. The computer-implemented method according to claim 1, wherein detecting and tagging private/sensitive data as part of a policy evaluation process for archiving to cloud storage comprises the steps of:

providing to a user a user interface enabling the user to define rules for data classification, identify source repositories, and set metadata-level rules relating to what content should be evaluated for possible archiving to cloud storage;

performing a crawl of the source repository with a first-level inspection process to identify only those items that meet the metadata-level policy criteria for inclusion and that are new/modified since the last crawl time;

performing a second-level inspection by fetching the inclusion items from the prior step, opening said items, rendering their text, and evaluating the private/sensitive data rules with regular expression pattern matching;

applying associated tags for each regular expression that is matched for items that meet private/sensitive data rules, apply the associated tag; and performing a third-level inspection based on the output data classification tags from the prior step to determine whether an item is eligible for archiving to the cloud storage or not.

12. The computer-implemented method according to claim 11, wherein if the item is eligible, standard archiving steps are performed so that the item is copied/moved to cloud storage; and if the item is not eligible logging that the item is excluded because of its data classification.

13. The computer-implemented method according to claim 11, further comprising forcing a full crawl mode so that the archiving process re-evaluates data classification inspections for each item regardless of the tags that might exist on the item.

14. The computer-implemented method according to claim 6, wherein new content can be ingested to the remote storage and all new item versions corresponding to the triggered value are checked and if any are for event-based retention field values that are "Trigger Completed" then the associated minimum retention period is applied immediately.

15. The computer-implemented method according to claim 1, further comprising converting any subset of the second predetermined portion of the backup copy back to the recovered source file system at a later point in time by merging back full originals of the subset of the second predetermined portion of the backup copy from the backup copy to the recovered source file system.

16. The computer-implemented method according to claim 1, wherein recovering unstructured data sets whereby only the active data is recovered in full and the inactive data is ghosted comprises a first process and a second process;

the first process comprises the steps of:

generating a backup copy of the source file system;

determining whether a recovery scenario is triggered;

upon a positive determination executing the further steps of:

providing a user interface in a recovery scenario allowing a user to assign a first predetermined portion of the backup copy to be recovered in full and a second predetermined portion of the backup copy should be recovered as at least one of pointers and stubs to the content rather than the recovered content;

fetching from the backup copy the first predetermined portion of the backup copy in full;

generating at least one of the pointer and stubs for the second predetermined portion of the backup copy; and providing one or more software applications accessing the recovered source file system a seamless recall on demand of an item of content within the second predetermined portion of the backup copy based upon the selection of an indication of the item of content within the one or more software applications and the at least one of the pointer and stub associated with the item of content; and the second process comprises the steps of:

evaluating a first trigger decision relating to whether a seamless recall is triggered from a ghosted pointer and/or stub;

upon a positive evaluation of the first trigger decision converting any portion of the ghosted data subset now on the source file system by merging back full originals from the backup copy as identified by the at least one of the pointers and the stubs selected within the one or more software applications;

upon a negative evaluation of the first trigger decision evaluating a second trigger decision relating to a seamless conversion of full originals in the source file system to at least one of ghosted items, ghosted pointers and ghosted stubs; and upon a positive evaluation of the second trigger decision full originals in the source file system are converted to at least one of ghosted items, ghosted pointers and ghosted stubs.

17. The computer-implemented method according to claim 16, wherein generating a backup copy of the source file system comprises accessing an archive.

18. The computer-implemented method according to claim 1, wherein an explicit retention period is not applied to the record until the trigger event occurs.

* * * * *